(12) United States Patent
Bourgeois et al.

(10) Patent No.: US 11,521,225 B1
(45) Date of Patent: Dec. 6, 2022

(54) SYSTEM AND METHOD FOR VEHICLE LOAN LEAD GENERATION

(71) Applicant: Centergy Consulting, LLC, Harahan, LA (US)

(72) Inventors: Edward J. Bourgeois, River Ridge, LA (US); Gabriel DeRepentigny, Radford, VA (US)

(73) Assignee: Centergy Consulting, LLC, Harahan, LA (US)

( * ) Notice: Subject to any disclaimer, the term of this patent is extended or adjusted under 35 U.S.C. 154(b) by 509 days.

(21) Appl. No.: 16/546,601

(22) Filed: Aug. 21, 2019

(51) Int. Cl.
*G06Q 30/06* (2012.01)
*G06Q 30/02* (2012.01)
*G06Q 40/02* (2012.01)

(52) U.S. Cl.
CPC ..... *G06Q 30/0212* (2013.01); *G06Q 30/0201* (2013.01); *G06Q 40/025* (2013.01)

(58) Field of Classification Search
CPC ........... G06Q 30/0212; G06Q 30/0201; G06Q 40/025
See application file for complete search history.

(56) References Cited

U.S. PATENT DOCUMENTS

| | | | |
|---|---|---|---|
| 2004/0122735 A1* | 6/2004 | Meshkin | G06Q 30/0265 |
| | | | 705/14.62 |
| 2007/0255663 A1* | 11/2007 | Jordan | G06Q 50/188 |
| | | | 705/80 |
| 2011/0161840 A1* | 6/2011 | Wong | G06F 16/972 |
| | | | 715/760 |
| 2017/0031963 A1* | 2/2017 | Merz | G06Q 20/322 |
| 2017/0053329 A1* | 2/2017 | Bowers | G06Q 30/0609 |

OTHER PUBLICATIONS

J Christopher Westland, Digital Storefronts, 1999, MIT Press, p. 448 (Year: 1999).*

* cited by examiner

*Primary Examiner* — Michael Bekerman
*Assistant Examiner* — Darnell A Pouncil
(74) *Attorney, Agent, or Firm* — AdamsIP, LLC; Edward B Garner, III; James H Adams

(57) ABSTRACT

A system and method for generating loans is provided. The system and method of the present disclosure are generally designed to encourage previous and current customers of a financial institution to use the services provided by the financial institution as well as attract new customers to the financial institution. The system generally comprises a computing entity, a processor operably connected to said computing entity via a network, a server operably connected to the processor via the network, and a non-transitory computer-readable medium having instructions stored thereon, wherein said instructions include multiple user interfaces. The user interfaces allow customers to research vehicles in which they may buy. The system also provides users with information about vehicle financing as well as providing financial institutions with information they may use to promote their services.

5 Claims, 13 Drawing Sheets

SYSTEM AND METHOD FOR VEHICLE LOAN LEAD GENERATION

FIELD OF THE DISCLOSURE

The subject matter of the present disclosure refers generally to a system and method for generating loans.

BACKGROUND

Online competition in the auto loan industry has become particularly fierce, and traditional financial institutions, such as credit unions and banks, are having a tough time competing against well-funded, focused, mass marketing organizations in this area since it has moved more online. This is particularly devastating to Credit Unions, which often times provide better financing, protection product terms, and product cost than these more focused organizations. By being unable to effectively compete in the online auto loan marketplace, both financial institutions and consumers lose out. Financial institutions lose because they are having a more difficult time than ever before retaining current customers and obtaining new customers. Consumers lose by paying higher costs when purchasing and financing vehicles. Further, because financial institutions are purchasing car loans to make their balance sheets look better, they are missing out on one of their primary goals, which is to enhance the financial well-being of their customers.

A typical consumer today will spend ten or more hours online researching prior to buying a vehicle. During this research, consumers are bombarded with auto loan and finance options, and many of these finance options come with instantaneous approval. If financial institutions could take advantage of this trend of online vehicle research, they might be able to obtain new customers who may otherwise go somewhere else for their auto loans. Additionally, an advantage financial institutions should be able to take advantage of is that they often possess the contact information of current customers and previous customers. However, many financial institutions do not have a system in place that would allow them to take advantage of this information in a way that encourages current and previous customers to use the vehicle research, pricing, and financing services the financial institutions provide. Because of this, financial institutions are failing to take advantage of a valuable resource that could generate new income by encouraging both current customers and potential new customers to take advantage of the financial institution's services.

Therefore, there is a need in the art for a system and method that encourages previous and current customers to use the services provided by a financial institution as well as attracting new customers to the financial institution.

SUMMARY

A system and method for marketing vehicle research, pricing, and financial services offered by financial institutions to customers is provided. In one aspect, the system markets auto loans to previous and current customers of a financial institution. This system may accomplish this by creating sweepstakes and adding previous and current customers to a targeted customers list, wherein the targeted customers are targeted for new auto loans. In another aspect, the invention allows new customers to input data and enter a sweepstakes, which may allow financial institutions to target those customers as leads for vehicle loans in the future. In yet another aspect, the invention allows users of the financial institution's website to access a vehicle finder application, which the users may utilize to locate vehicles for sale and determine what their estimated monthly payments would be for said vehicles when financed through the financial institution. Further aspects of the system allow the financial institution to target social media or email advertising messaging to customers.

The system generally comprises a computing entity having a user interface, a processor operably connected to said computing entity via a network, a server operably connected to the processor via the network, and a non-transitory computer-readable medium having instructions stored thereon, wherein said instructions include a vehicle finder application (VFA), integrated marketing system (IMS), and lead widget that may be accessed via a user interface of a computing system. In one preferred embodiment, a database may be operably connected to the processor and/or server store user data within user profiles. The database may also be used to store various types of vehicle data.

The vehicle finder application (VFA) portion of the system allows an end user (customer) to search for vehicles for sale both in their local area as well as around the country. The VFA has features such as a customized look-and-feel to match the financial institution's branding, loan lead generation to the financial institution, monthly payment estimations based on the financial institution's rate sheet, product quotes for the financial institution's auto protection products, a yearly depreciation estimator, a vehicle sale time estimator, a multi-variate price analysis system, and a find-better-price function. The three main user interfaces of the VFA are a search widget, a search results page (SRP), and a vehicle details page (VDP). The search widget is embeddable on the financial institution's website, online banking platform, or mobile banking app. It allows the customer to initiate a search for a vehicle. The SRP displays vehicle listings that match the search parameters that the customer submitted. The SRP also allows the customer to adjust their search parameters to find other vehicles or to narrow down their search results. The VDP displays all details about the particular listing. In particular, the vehicle data (year, make, model, body style, engine, drivetrain, transmission, etc.), the price, the price rating, the depreciation estimates, and the sales analysis will be displayed.

When the customer initiates a search using the search widget, they are taken to the SRP. From the SRP, the customer can access the VDP for any vehicle. If the financial institution has any disallowed dealers in the database, listings from these dealers are filtered out of the search results on the SRP. If the financial institution has any approved dealers in the database, the listings on the SRP are restricted to only listings from these dealers. If the financial institution has any preferred dealers in the database, any matching listings from these dealers are sorted to the top of the search results on the SRP. The SRP and VDP display a monthly payment estimate for each matching vehicle. The monthly payment is preferably calculated based on the rate sheet saved within a user profile of a financial institution. The customer may input their estimated credit score to alter the monthly payment estimates. The VFA may also calculate auto product quotes for each particular vehicle and include these quotes in the monthly payment calculation.

The integrated marketing system provides tools for the financial institution that allow them to market their financial services to their customers. Specifically, the IMS may consist of a social media marketing system (SMMS) and an email marketing system (EMS). The SMMS of the IMS allows financial institutions to promote vehicle buying, research, and education tools to their customers via social media platforms. The EMS is designed to assist a financial institution target customers who have used their services in the past with certain product offers and information. The EMS may also assist financial institutions target existing customers as well as new customers.

The lead widget provides financial institutions the ability to target consumers visiting their websites and provides consumers with the ability to enter an ongoing sweepstakes. It also provides the ability to deliver third-party advertising network cookies to consumer devices for further targeting of ads to those consumers. The system also allows users to receive, acknowledge, and store notes relating to leads originating through the various components of the system as well as allows administrative users to receive notices when leads go unacknowledged.

The method for creating targeted customer lists and then generating an offer ID that may be used to create offer emails is as follows. A user may upload a spreadsheet containing customer data, which may then be parsed by the processor into an internal data structure. Once the spreadsheet has been parsed, the processor may generate a multi-character alpha numeric string called a User ID and associate said alpha numeric string with the customer data. The processor may then communicate the customer data and associated alpha numeric string to the server and/or database. In another preferred embodiment, the processor may save the customer data and associated alpha numeric string to the non-transitory computer-readable medium of the computing entity. The system may create a targeted customer list having a unique ID and subsequently assign the unique ID of the targeted customer list to each user profile that is to be targeted by the system.

Once the targeted customer lists have been created by the system, the user may select a targeted customer list and input sweepstakes data via the user interface. The sweepstakes data and targeted customer list may then be transmitted to the server. Once the server has received the sweepstakes data and targeted customer list, the system may generate a vehicle upgrade offer for each targeted customer on the list. In a preferred embodiment, the user may select which targeted customers within a targeted customer list may receive a vehicle upgrade offer. The system may then determine a targeted customer's vehicle by decoding any customer data associated with the targeted customer. In a preferred embodiment, the system uses a VIN to determine a targeted customer's vehicle, wherein the VIN is passed to a third-party VIN decoding service via the network. The third-party VIN decoding service may then parse and return to the system the year, make, and model that corresponds to the targeted customer's VIN.

Depending on the results of the check, the system may take an action. If the system is unable to determine the targeted customer's vehicle, the system may proceed to the next step. If the system is able to determine the targeted customer's vehicle, the system may search a vehicle database for the newest model of the targeted customer's vehicle. In one preferred embodiment, the system may terminate the method if the targeted customer's vehicle has no new models within the past two years. In another preferred embodiment, the system may search for vehicles that are similar to the targeted customer's vehicle, wherein the system may recommend vehicles that are similar to the targeted customer's vehicle should the system be unable to find a newer model of the targeted customer's vehicle than what is in the user profile. Once the system has determined the newest model of the targeted customer's vehicle, the system may transmit the newest model of the targeted customer's vehicle to the database to be stored within the user profile. The system may then generate a multi-character alpha numeric string called an Offer ID and associate said Offer ID with the sweepstakes data, vehicle data, and customer data. In a preferred embodiment, the alpha numeric string comprises 16 characters. Once the Offer ID has been created and stored within the database, the method may proceed to terminate the method.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For instance, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For instance, a system "comprising" components A, B, and C can contain only components A, B, and C, or can contain not only components A, B, and C, but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

As will be evident from the disclosure provided below, the present invention satisfies the need for a system and method capable of encouraging new customers to purchase vehicles using auto loans obtained from a financial institution as well as encouraging existing members to purchase new vehicles using information already owned by the financial institution.

Figure 1:
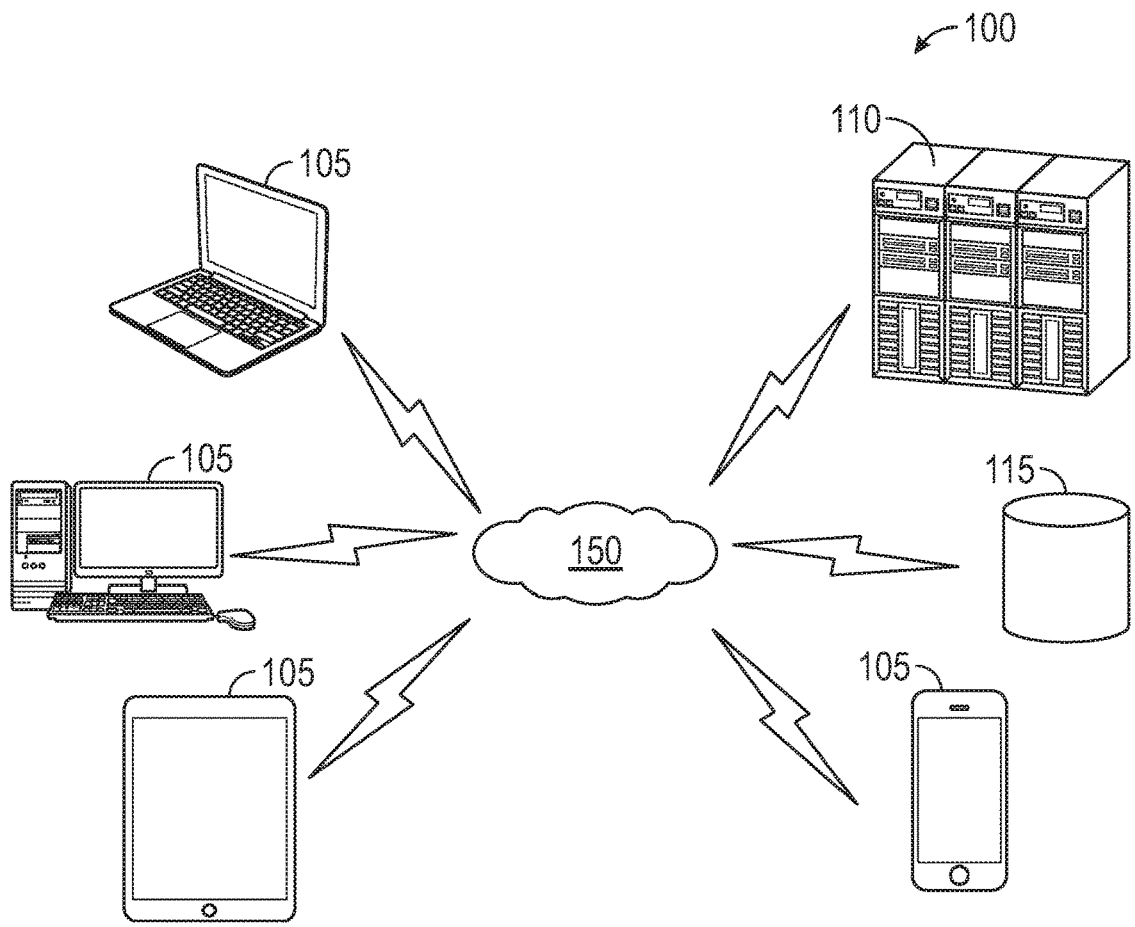
FIG. 1 is a diagram of an example environment in which techniques described herein may be implemented.

FIG. 1 depicts an exemplary environment 100 of the system 400 consisting of clients 105 connected to a server 110 and/or database 115 via a network 150. Clients 105 are devices of users 405 that may be used to access servers 110 and/or databases 115 through a network 150. A network 150 may comprise of one or more networks of any kind, including, but not limited to, a local area network (LAN), a wide area network (WAN), metropolitan area networks (MAN), a telephone network, such as the Public Switched Telephone Network (PSTN), an intranet, the Internet, a memory device, another type of network, or a combination of networks. In a preferred embodiment, computing entities 200 may act as clients 105 for a user 405. For instance, a client 105 may include a personal computer, a wireless telephone, a personal digital assistant (PDA), a laptop, a smart phone, a tablet computer, or another type of computation or communication device. Servers 110 may include devices that access, fetch, aggregate, process, search, provide, and/or maintain documents. Although FIG. 1 depicts a preferred embodiment of an environment 100 for the system 400, in other implementations, the environment 100 may contain fewer components, different components, differently arranged components, and/or additional components than those depicted in FIG. 1. Alternatively, or additionally, one or more components of the environment 100 may perform one or more other tasks described as being performed by one or more other components of the environment 100.

As depicted in FIG. 1, one embodiment of the system 400 may comprise a server 110. Although shown as a single server 110 in FIG. 1, a server 110 may, in some implementations, be implemented as multiple devices interlinked together via the network 150, wherein the devices may be distributed over a large geographic area and performing different functions or similar functions. For instance, two or more servers 110 may be implemented to work as a single server 110 performing the same tasks. Alternatively, one server 110 may perform the functions of multiple servers 110. For instance, a single server 110 may perform the tasks of a web server and an indexing server 110. Additionally, it is understood that multiple servers 110 may be used to operably connect the processor 220 to the database 115 and/or other content repositories. The processor 220 may be operably connected to the server 110 via wired or wireless connection. Types of servers 110 that may be used by the system 400 include, but are not limited to, search servers, document indexing servers, and web servers, or any combination thereof.

Search servers may include one or more computing entities 200 designed to implement a search engine, such as a documents/records search engine, general webpage search engine, etc. Search servers may, for example, include one or more web servers designed to receive search queries and/or inputs from users 405, search one or more databases 115 in response to the search queries and/or inputs, and provide documents or information, relevant to the search queries and/or inputs, to users 405. In some implementations, search servers may include a web search server that may provide webpages 500 to users 405, wherein a provided webpage 500 may include a reference to a web server at which the desired information and/or links are located. The references to the web server at which the desired information is located may be included in a frame and/or text box, or as a link to the desired information/document. Document indexing servers may include one or more devices designed to index documents available through networks 150. Document indexing servers may access other servers 110, such as web servers that host content, to index the content. In some implementations, document indexing servers may index documents/records stored by other servers 110 connected to the network 150. Document indexing servers may, for example, store and index content, information, and documents relating to user accounts and user-generated content. Web servers may include servers 110 that provide webpages 500 to clients 105. For instance, the webpages 500 may be HTML-based webpages. A web server may host one or more websites. As used herein, a website may refer to a collection of related webpages 500. Frequently, a website may be associated with a single domain name, although some websites may potentially encompass more than one domain name. The concepts described herein may be applied on a per-website basis. Alternatively, in some implementations, the concepts described herein may be applied on a per-webpage basis.

As used herein, a database 115 refers to a set of related data and the way it is organized. Access to this data is usually provided by a database management system (DBMS) consisting of an integrated set of computer software that allows users 405 to interact with one or more databases 115 and provides access to all of the data contained in the database 115. The DBMS provides various functions that allow entry, storage and retrieval of large quantities of information and provides ways to manage how that information is organized. Because of the close relationship between the database 115 and the DBMS, as used herein, the term database 115 refers to both a database 115 and DBMS.

Figure 2:
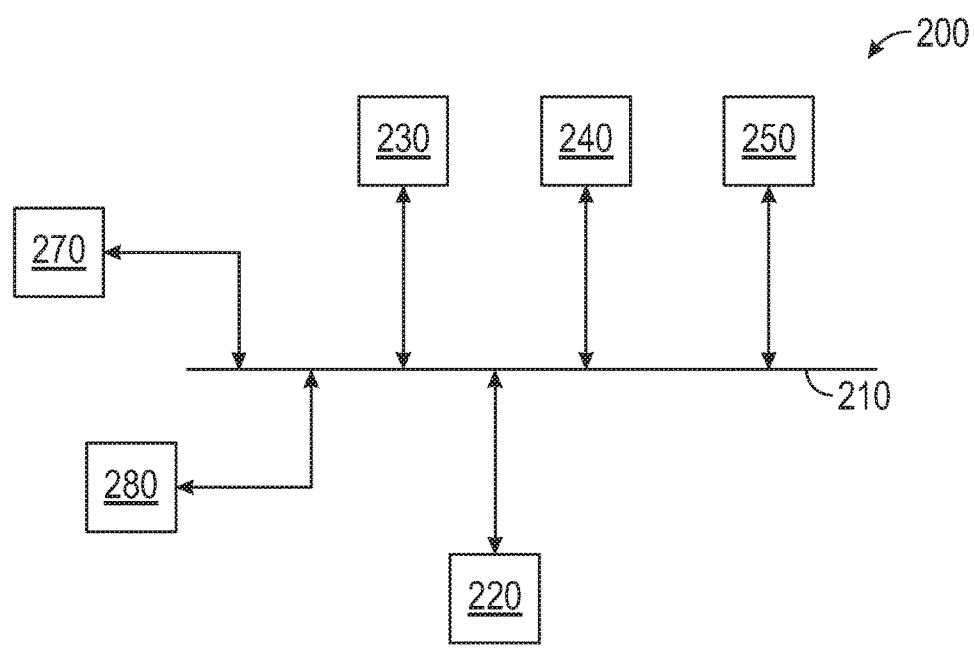
FIG. 2 is a diagram of an example environment in which techniques described herein may be implemented.

FIG. 2 is an exemplary diagram of a client 105, server 110, and/or or database 115 (hereinafter collectively referred to as "computing entity 200"), which may correspond to one or more of the clients 105, servers 110, and databases 115 according to an implementation consistent with the principles of the invention as described herein. The computing entity 200 may comprise a bus 210, a processor 220, memory 304, a storage device 250, a peripheral device 270, and a communication interface 280. The bus 210 may be defined as one or more conductors that permit communication among the components of the computing entity 200. The processor 220 may be defined as a logic circuitry that responds to and processes the basic instructions that drive the computing entity 200. Memory 304 may be defined as the integrated circuitry that stores information for immediate use in a computing entity 200. A peripheral device 270 may be defined as any hardware used by a user 405 and/or the computing entity 200 to facilitate communicate between the two. A storage device 250 may be defined as a device used to provide mass storage to a computing entity 200. A communication interface 280 may be defined as any transceiver-like device that enables the computing entity 200 to communicate with other devices and/or computing entities 200.

The bus 210 may comprise a high-speed interface 308 and/or a low-speed interface 312 that connects the various components together in a way such they may communicate with one another. A high-speed interface 308 manages bandwidth-intensive operations for computing device 300, while a low-speed interface 312 manages lower bandwidth-intensive operations. In some preferred embodiments, the high-speed interface 308 of a bus 210 may be coupled to the memory 304, display 316, and to high-speed expansion ports 310, which may accept various expansion cards such as a graphics processing unit (GPU). In other preferred embodiments, the low-speed interface 312 of a bus 210 may be coupled to a storage device 250 and low-speed expansion ports 314. The low-speed expansion ports 314 may include various communication ports, such as USB, Bluetooth, Ethernet, wireless Ethernet, etc. Additionally, the low-speed expansion ports 314 may be coupled to one or more peripheral devices 270, such as a keyboard, pointing device, scanner, and/or a networking device, wherein the low-speed expansion ports 314 facilitate the transfer of input data from the peripheral devices 270 to the processor 220 via the low-speed interface 312.

The processor 220 may comprise any type of conventional processor or microprocessor that interprets and executes computer readable instructions. The processor 220 is configured to perform the operations disclosed herein based on instructions stored within the system 400. The processor 220 may process instructions for execution within the computing entity 200, including instructions stored in memory 304 or on a storage device 250, to display graphical information for a graphical user interface (GUI) on an external peripheral device 270, such as a display 316. The processor 220 may provide for coordination of the other components of a computing entity 200, such as control of user interfaces 410, applications run by a computing entity 200, and wireless communication by a communication device of the computing entity 200. The processor 220 may be any processor or microprocessor suitable for executing instructions. In some embodiments, the processor 220 may have a memory device therein or coupled thereto suitable for storing the data, content, or other information or material disclosed herein. In some instances, the processor 220 may be a component of a larger computing entity 200. A computing entity 200 that may house the processor 220 therein may include, but are not limited to, laptops, desktops, workstations, personal digital assistants, servers, mainframes, cellular telephones, tablet computers, or any other similar device. Accordingly, the inventive subject matter disclosed herein, in full or in part, may be implemented or utilized in devices including, but are not limited to, laptops, desktops, workstations, personal digital assistants, servers, mainframes, cellular telephones, tablet computers, or any other similar device.

Memory 304 stores information within computing device 300. In some preferred embodiments, memory 304 may include one or more volatile memory units. In another preferred embodiment, memory 304 may include one or more non-volatile memory units. Memory 304 may also include another form of computer-readable medium, such as a magnetic or optical disk. For instance, a portion of a magnetic hard drive may be partitioned as a dynamic scratch space to allow for temporary storage of information that may be used by the processor 220 when faster types of memory, such as random-access memory (RAM), are in high demand. A computer-readable medium may refer to a non-transitory computer-readable memory device. A memory device may refer to storage space within a single storage device 250 or spread across multiple storage devices 250. The memory 304 may comprise main memory 230 and/or read only memory (ROM) 240. In a preferred embodiment, the main memory 230 may comprise RAM or another type of dynamic storage device 250 that stores information and instructions for execution by the processor 220. ROM 240 may comprise a conventional ROM device or another type of static storage device 250 that stores static information and instructions for use by processor 220. The storage device 250 may comprise a magnetic and/or optical recording medium and its corresponding drive.

As mentioned earlier, a peripheral device 270 is a device that facilitates communication between a user 405 and the processor 220. The peripheral device 270 may include, but is not limited to, an input device and/or an output device. As used herein, an input device may be defined as a device that allows a user 405 to input data and instructions that is then converted into a pattern of electrical signals in binary code that are comprehensible to a computing entity 200. An input device of the peripheral device 270 may include one or more conventional devices that permit a user 405 to input information into the computing entity 200, such as a scanner, phone, camera, scanning device, keyboard, a mouse, a pen, voice recognition and/or biometric mechanisms, etc. As used herein, an output device may be defined as a device that translates the electronic signals received from a computing entity 200 into a form intelligible to the user 405. An output device of the peripheral device 270 may include one or more conventional devices that output information to a user 405, including a display 316, a printer, a speaker, an alarm, a projector, etc. Additionally, storage devices 250, such as CD-ROM drives, and other computing entities 200 may act as a peripheral device 270 that may act independently from the operably connected computing entity 200. For instance, a fitness tracker may transfer data to a smartphone, wherein the smartphone may use that data in a manner separate from the fitness tracker.

The storage device 250 is capable of providing the computing entity 200 mass storage. In some embodiments, the storage device 250 may comprise a computer-readable medium such as the memory 304, storage device 250, or memory 304 on the processor 220. A computer-readable medium may be defined as one or more physical or logical memory devices and/or carrier waves. Devices that may act as a computer readable medium include, but are not limited to, a hard disk device, optical disk device, tape device, flash memory or other similar solid-state memory device, or an array of devices, including devices in a storage area network or other configurations. Examples of computer-readable mediums include, but are not limited to, magnetic media such as hard disks, floppy disks, and magnetic tape; optical media such as CD ROM discs and DVDs; magneto-optical media such as optical discs; and hardware devices that are specially configured to store and perform programming instructions, such as ROM 240, RAM, flash memory, and the like.

In an embodiment, a computer program may be tangibly embodied in the storage device 250. The computer program may contain instructions that, when executed by the processor 220, performs one or more steps that comprise a method, such as those methods described herein. The instructions within a computer program may be carried to the processor 220 via the bus 210. Alternatively, the computer program may be carried to a computer-readable medium, wherein the information may then be accessed from the computer-readable medium by the processor 220 via the bus 210 as needed. In a preferred embodiment, the software instructions may be read into memory 304 from another computer-readable medium, such as data storage device 250, or from another device via the communication interface 280. Alternatively, hardwired circuitry may be used in place of or in combination with software instructions to implement processes consistent with the principles as described herein. Thus, implementations consistent with the invention as described herein are not limited to any specific combination of hardware circuitry and software.

Figure 3:
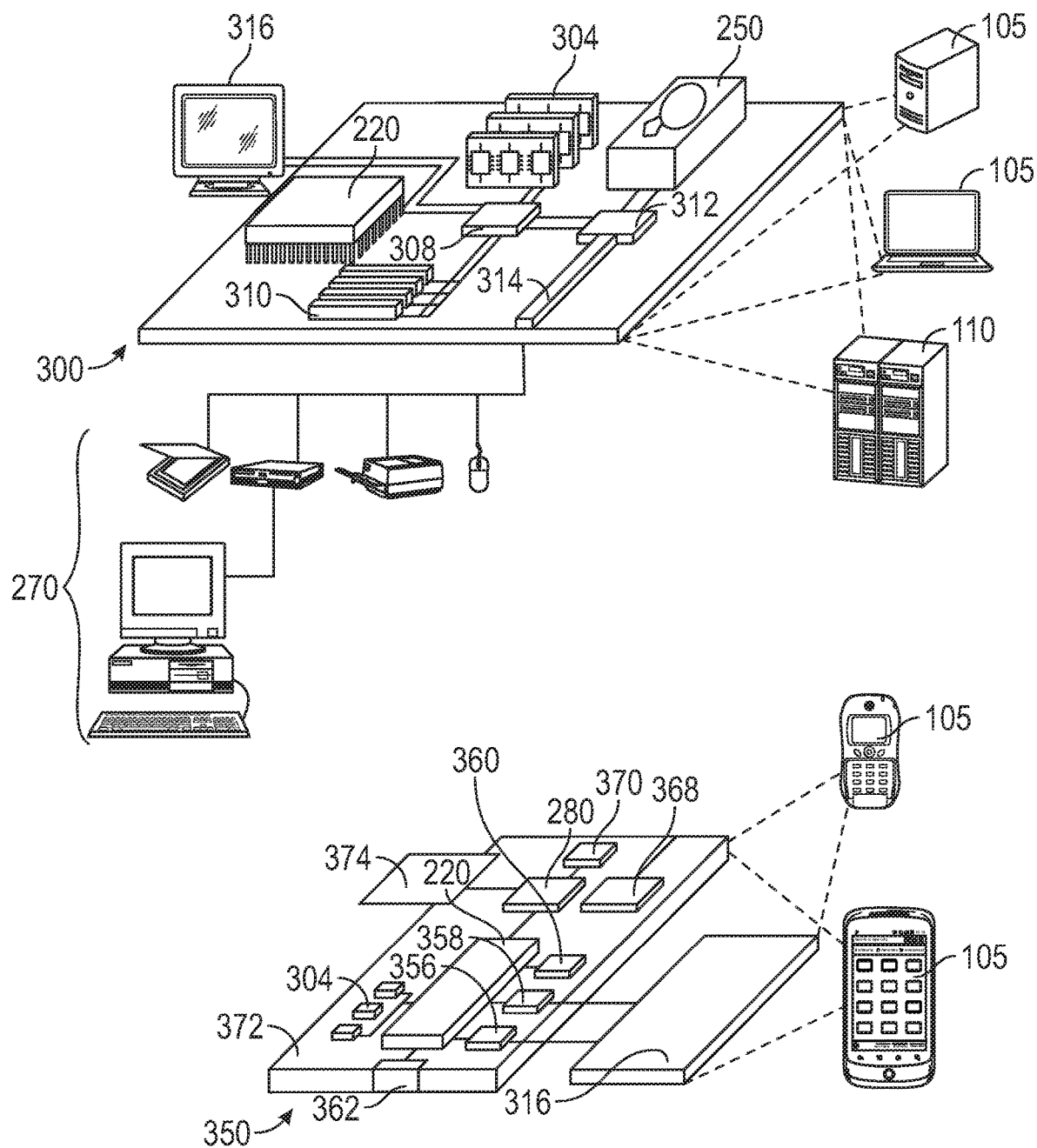
FIG. 3 is a diagram of an example environment in which techniques described herein may be implemented.

FIG. 3 depicts exemplary computing entities 200 in the form of a computing device 300 and mobile computing device 350, which may be used to carry out the various embodiments of the invention as described herein. A computing device 300 is intended to represent various forms of digital computers, such as laptops, desktops, workstations, servers, databases, mainframes, and other appropriate computers. A mobile computing device 350 is intended to represent various forms of mobile devices, such as scanners, scanning devices, personal digital assistants, cellular telephones, smart phones, tablet computers, and other similar devices. The various components depicted in FIG. 3, as well as their connections, relationships, and functions are meant to be examples only, and are not meant to limit the implementations of the invention as described herein. The computing device 300 may be implemented in a number of different forms, as shown in FIGS. 1 and 3. For instance, a computing device 300 may be implemented as a server 110 or in a group of servers 110. Computing devices 300 may also be implemented as part of a rack server system. In addition, a computing device 300 may be implemented as a personal computer, such as a desktop computer or laptop computer. Alternatively, components from a computing device 300 may be combined with other components in a mobile device, thus creating a mobile computing device 350. Each mobile computing device 350 may contain one or more computing devices 300 and mobile devices, and an entire system may be made up of multiple computing devices 300 and mobile devices communicating with each other as depicted by the mobile computing device 350 in FIG. 3. The computing entities 200 consistent with the principles of the invention as disclosed herein may perform certain receiving, communicating, generating, output providing, correlating, and storing operations as needed to perform the various methods as described in greater detail below.

In the embodiment depicted in FIG. 3, a computing device 300 may include a processor 220, memory 304 a storage device 250, high-speed expansion ports 310, low-speed expansion ports 314, and bus 210 operably connecting the processor 220, memory 304, storage device 250, high-speed expansion ports 310, and low-speed expansion ports 314. In one preferred embodiment, the bus 210 may comprise a high-speed interface 308 connecting the processor 220 to the memory 304 and high-speed expansion ports 310 as well as a low-speed interface 312 connecting to the low-speed expansion ports 314 and the storage device 250. Because each of the components are interconnected using the bus 210, they may be mounted on a common motherboard as depicted in FIG. 3 or in other manners as appropriate. The processor 220 may process instructions for execution within the computing device 300, including instructions stored in memory 304 or on the storage device 250. Processing these instructions may cause the computing device 300 to display graphical information for a GUI on an output device, such as a display 316 coupled to the high-speed interface 308. In other implementations, multiple processors and/or multiple buses may be used, as appropriate, along with multiple memory units and/or multiple types of memory. Additionally, multiple computing devices may be connected, wherein each device provides portions of the necessary operations.

A mobile computing device 350 may include a processor 220, memory 304 a peripheral device 270 (such as a display 316, a communication interface 280, and a transceiver 368, among other components). A mobile computing device 350 may also be provided with a storage device 250, such as a micro-drive or other previously mentioned storage device 250, to provide additional storage. Preferably, each of the components of the mobile computing device 350 are interconnected using a bus 210, which may allow several of the components of the mobile computing device 350 to be mounted on a common motherboard as depicted in FIG. 3 or in other manners as appropriate. In some implementations, a computer program may be tangibly embodied in an information carrier. The computer program may contain instructions that, when executed by the processor 220, perform one or more methods, such as those described herein. The information carrier is preferably a computer-readable medium, such as memory, expansion memory 374, or memory 304 on the processor 220 such as ROM 240, that may be received via the transceiver or external interface 362. The mobile computing device 350 may be implemented in a number of different forms, as shown in FIG. 3. For example, a mobile computing device 350 may be implemented as a cellular telephone, part of a smart phone, personal digital assistant, or other similar mobile device.

The processor 220 may execute instructions within the mobile computing device 350, including instructions stored in the memory 304 and/or storage device 250. The processor 220 may be implemented as a chipset of chips that may include separate and multiple analog and/or digital processors. The processor 220 may provide for coordination of the other components of the mobile computing device 350, such as control of the user interfaces 410, applications run by the mobile computing device 350, and wireless communication by the mobile computing device 350. The processor 220 of the mobile computing device 350 may communicate with a user 405 through the control interface 358 coupled to a peripheral device 270 and the display interface 356 coupled to a display 316. The display 316 of the mobile computing device 350 may include, but is not limited to, Liquid Crystal Display (LCD), Light Emitting Diode (LED) display, Organic Light Emitting Diode (OLED) display, and Plasma Display Panel (PDP), or any combination thereof. The display interface 356 may include appropriate circuitry for causing the display 316 to present graphical and other information to a user 405. The control interface 358 may receive commands from a user 405 via a peripheral device 270 and convert the commands into a computer readable signal for the processor 220. In addition, an external interface 362 may be provided in communication with processor 220, which may enable near area communication of the mobile computing device 350 with other devices. The external interface 362 may provide for wired communications in some implementations or wireless communication in other implementations. In a preferred embodiment, multiple interfaces may be used in a single mobile computing device 350 as is depicted in FIG. 3.

Memory 304 stores information within the mobile computing device 350. Devices that may act as memory 304 for the mobile computing device 350 include, but are not limited to computer-readable media, volatile memory, and non-volatile memory. Expansion memory 374 may also be provided and connected to the mobile computing device 350 through an expansion interface 372, which may include a Single In-Line Memory Module (SIM) card interface or micro secure digital (Micro-SD) card interface. Expansion memory 374 may include, but is not limited to, various types of flash memory and non-volatile random-access memory (NVRAM). Such expansion memory 374 may provide extra storage space for the mobile computing device 350. In addition, expansion memory 374 may store computer programs or other information that may be used by the mobile computing device 350. For instance, expansion memory 374 may have instructions stored thereon that, when carried out by the processor 220, cause the mobile computing device 350 perform the methods described herein. Further, expansion memory 374 may have secure information stored thereon; therefore, expansion memory 374 may be provided as a security module for a mobile computing device 350, wherein the security module may be programmed with instructions that permit secure use of a mobile computing device 350. In addition, expansion memory 374 having secure applications and secure information stored thereon may allow a user 405 to place identifying information on the expansion memory 374 via the mobile computing device 350 in a non-hackable manner.

A mobile computing device 350 may communicate wirelessly through the communication interface 280, which may include digital signal processing circuitry where necessary. The communication interface 280 may provide for communications under various modes or protocols, including, but not limited to, Global System Mobile Communication (GSM), Short Message Services (SMS), Enterprise Messaging System, Multimedia Messaging Service (MIMS), Code Division Multiple Access (CDMA), Time Division Multiple Access (TDMA), Personal Digital Cellular (PDC), Wideband Code Division Multiple Access (WCDMA), IMT Multi-Carrier (CDMAX 0), and General Packet Radio Service (GPRS), or any combination thereof. Such communication may occur, for example, through a transceiver 368. Short-range communication may occur, such as using a Bluetooth, WIFI, or other such transceiver 368. In addition, a Global Positioning System (GPS) receiver module 370 may provide additional navigation- and location-related wireless data to the mobile computing device 350, which may be used as appropriate by applications running on the mobile computing device 350. Alternatively, the mobile computing device 350 may communicate audibly using an audio codec 360, which may receive spoken information from a user 405 and covert the received spoken information into a digital form that may be processed by the processor 220. The audio codec 360 may likewise generate audible sound for a user 405, such as through a speaker, e.g., in a handset of mobile computing device 350. Such sound may include sound from voice telephone calls, recorded sound such as voice messages, music files, etc. Sound may also include sound generated by applications operating on the mobile computing device 350.

The system 400 may also comprise a power supply. The power supply may be any source of power that provides the system 400 with power. In an embodiment, the power supply may be a stationary power outlet. The system 400 may comprise of multiple power supplies that may provide power to the system 400 in different circumstances. For instance, the system 400 may be directly plugged into a stationary power outlet, which may provide power to the system 400 so long as it remains in one place. However, the system 400 may also be connected to a backup battery so that the system 400 may receive power even when the it is not connected to a stationary power outlet or if the stationary power outlet ceases to provide power to the computing entity 200.

Figure 4:
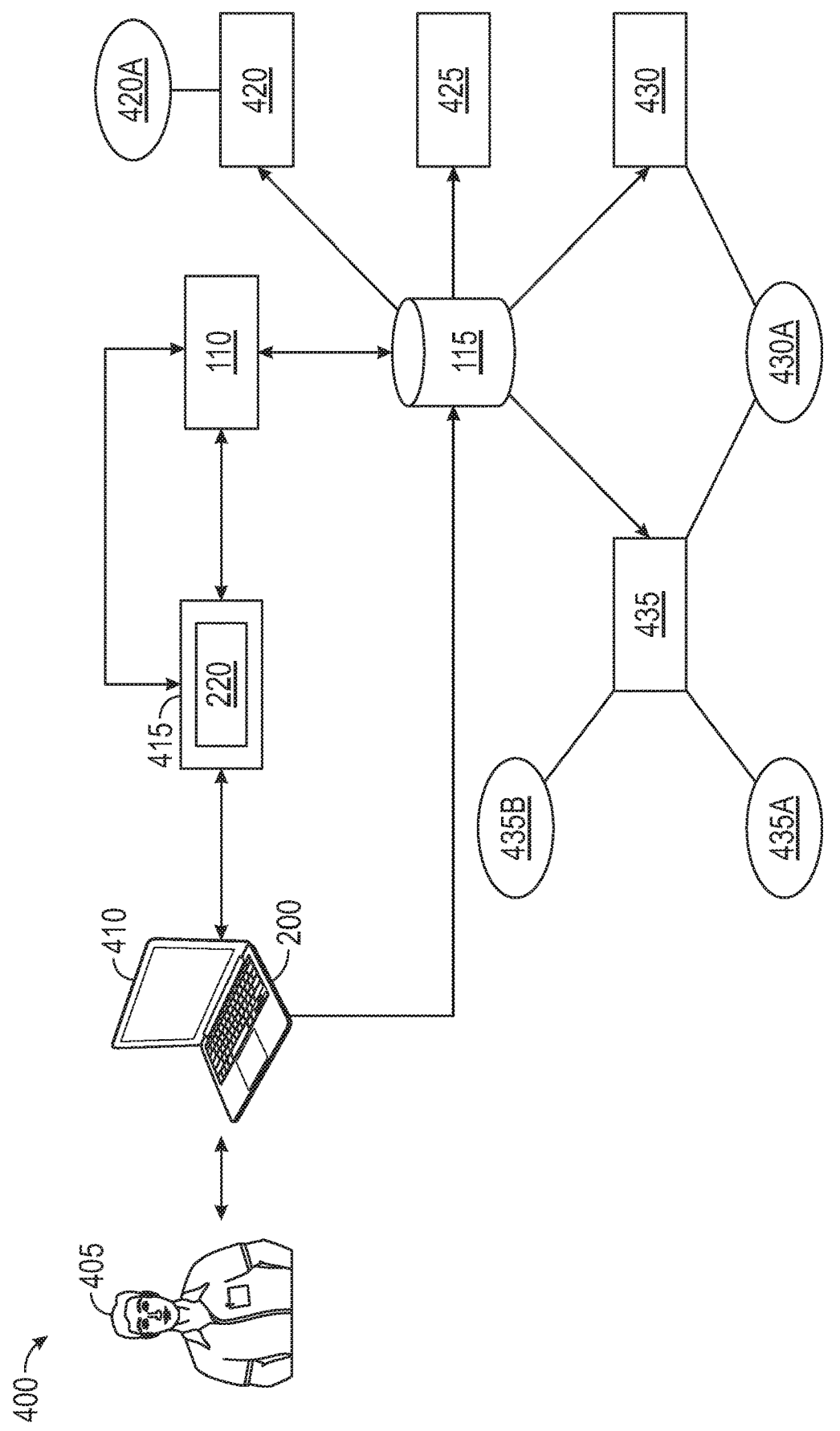
FIG. 4 is a diagram of an example environment in which techniques described herein may be implemented.
Figure 5:
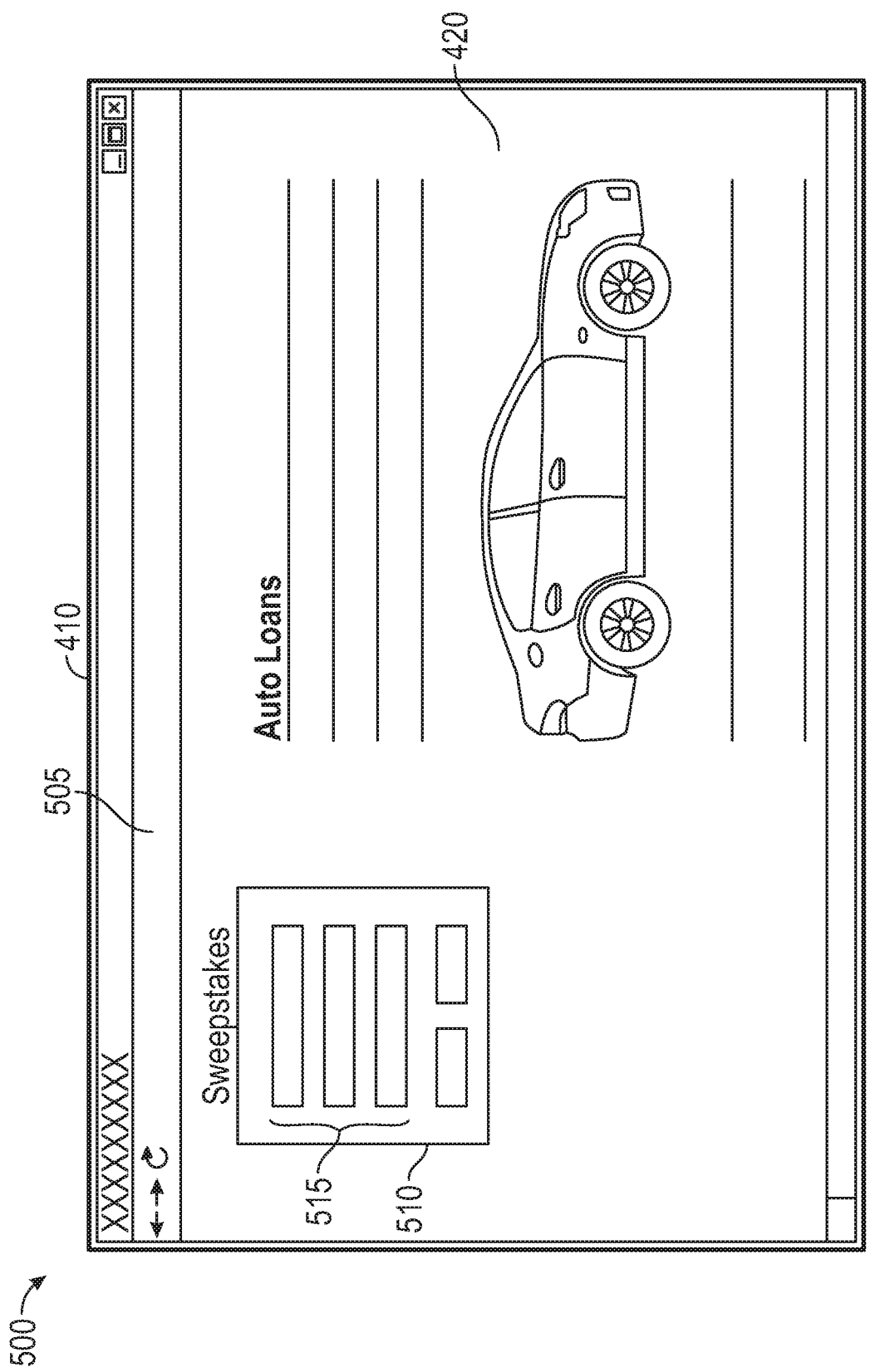
FIG. 5 is an example website in which a lead widget may be embedded.
Figure 6:
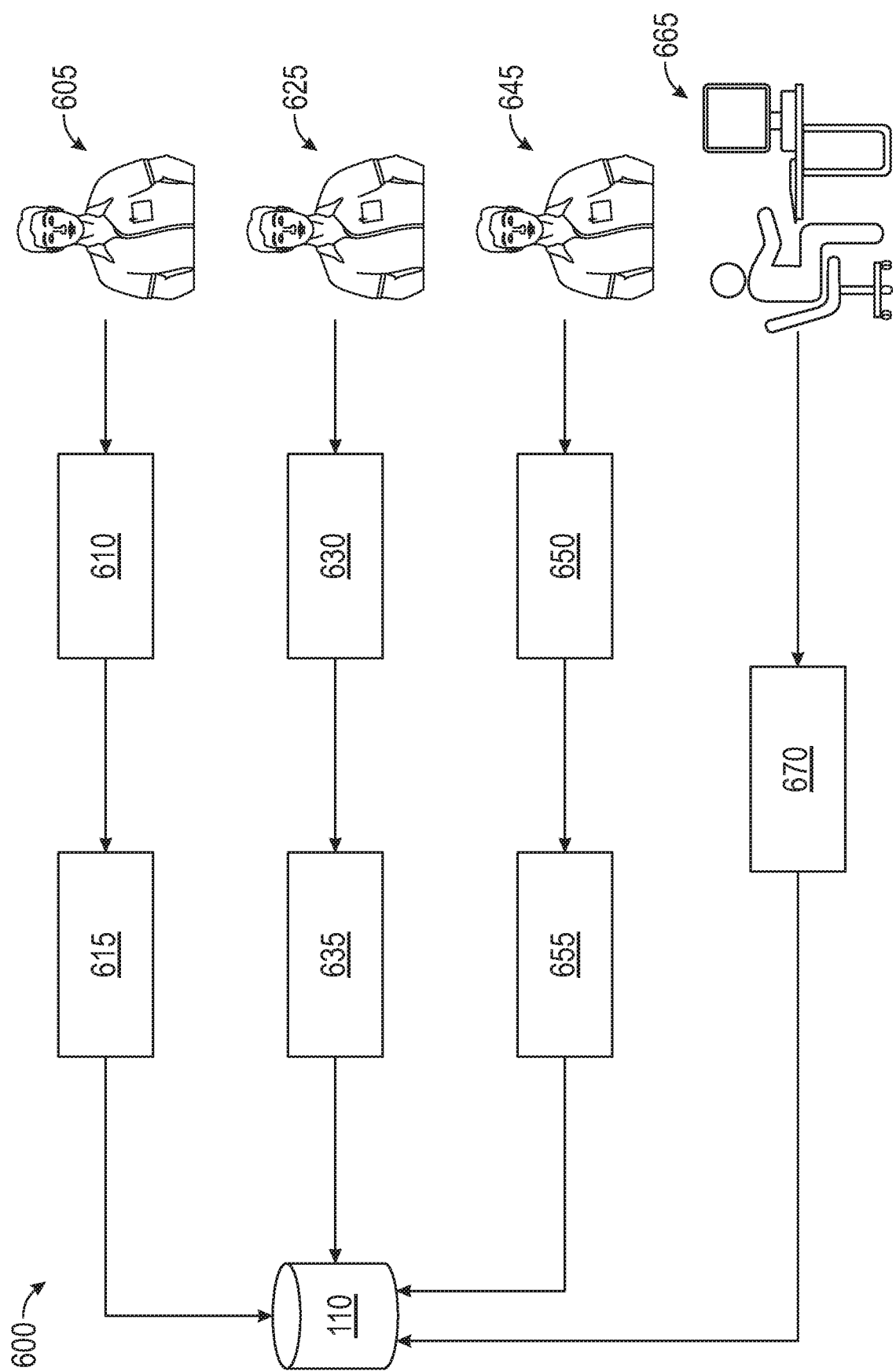
FIG. 6 is a diagram illustrating the manner in which individual access to data may be granted or limited based on user or system roles.

FIGS. 4-14 illustrate embodiments of a system 400 and method 700, 800, 900, 1000, 1100, 1200, 1300, 1400 for encouraging customers to use a financial institution's services. In particular, the system 400 and method 700, 800, 900, 1000, 1100, 1200, 1300, 1400 are designed to encourage customers who may be looking for a new automobile to acquire an auto loan from the financial institution. As illustrated in FIG. 4, the system 400 generally comprises a computing entity 200 having a user interface 410, a processor 220 operably connected to said computing entity 200 via a network 150, a server 110 operably connected to the processor 220 via the network 150, and a non-transitory computer-readable medium 415 having instructions stored thereon, wherein said instructions include a vehicle finder application (VFA), integrated marketing system (IMS), and lead widget that may be accessed via a user interface 410 of a computing system 400. In one preferred embodiment, a database 115 may be operably connected to the processor 220 and/or server 110 store user data 430A within user profiles 430. The database 115 may also be used to store various types of vehicle data 425. FIG. 5 illustrates a webpage 500 having a lead widget 510 embedded within the parent-document 505, wherein the lead widget 510 may take information input by a customer and add it to a user profile 430. The lead widget 510 may take also take information input by a customer and said customer into a sweepstakes 435. FIG. 6 illustrates permission levels 600 that may be utilized by the system 400 for controlling access to user content 615, 635, 655 such as user data 430A. It is understood that the various method steps associated with the methods 700, 800, 900, 1000, 1100, 1200, 1300, 1400 of the present disclosure may be carried out as operations by the system 400 shown in FIG. 4. FIGS. 7-13 illustrate various methods 700, 800, 900, 1000, 1100, 1200, 1300, 1400 that may be carried out by the system 400.

One preferred embodiment of the system 400 may comprise a database 115 operably connected to the processor 220. The database 115 may be configured to store user data 430A within user profiles 430. User data 430A may be defined as personal information of a user 405 such as gender, social security number, age, VIN number, and credit rating. User data 430A may also comprise information of a financial institution, including, but not limited to, corporate name, current listings table, listing history table, client table, user table, access tokens table, shared posts table, client posts table, and modified posts table, or any combination thereof. The database 115 may also be configured to store website data 420A. Website data 420A may be defined as information relevant to a particular website 420, including, but not limited to, JavaScript code, HTML code, text data, picture data, etc. In a preferred embodiment, a user profile 430 is related to a particular user 405, but in other embodiments, a user profile 430 may relate to multiple users 405 possessing similar characteristics. A user 405 is preferably associated with a particular user profile 430 based on an IP address. However, it is understood that a user 405 may be associated with a user profile 430 using a variety of methods without departing from the inventive subject matter herein.

Various components of the system 400 may further comprise a user interface 410. A user interface 410 may be defined as a space where interactions between a user 405 and the system 400 may take place. In an embodiment, the interactions may take place in a way such that a user 405 may control the operations of the system 400. A user interface 410 may include, but is not limited to operating system 400s, command line user interfaces, conversational interfaces, web-based user interfaces, zooming user interfaces, touch screens, task-based user interfaces, touch user interfaces, text-based user interfaces, intelligent user interfaces, and graphical user interfaces, or any combination thereof. The system 400 may present data of the user interface 410 to the user 405 via a display 316 operably connected to the processor 220. A display 316 may be defined as an output device that communicates data that may include, but is not limited to, visual, auditory, cutaneous, kinesthetic, olfactory, and gustatory, or any combination thereof.

Information presented via a display 316 may be referred to as a soft copy of the information because the information exists electronically and is presented for a temporary period of time. Information stored on the non-transitory computer-readable medium 415 may be referred to as the hard copy of the information. For instance, a display 316 may present a soft copy of visual information via a liquid crystal display (LCD), wherein the hardcopy of the visual information is stored on a local hard drive. For instance, a display 316 may present a soft copy of audio information via a speaker, wherein the hard copy of the audio information is stored on a flash drive. For instance, a display 316 may present a soft copy of visual information via a LCD monitor, wherein the hard copy of the visual information is stored within a database 115. Displays 316 may include, but are not limited to, cathode ray tube monitors, LCD monitors, light emitting diode (LED) monitors, gas plasma monitors, screen readers, speech synthesizers, virtual reality headsets, speakers, and scent generating devices, or any combination thereof.

As defined herein, a webpage 500 is an electronic document that contains information and is located at a particular location on a network 150. A user 405 may access the electronic document by inputting an address within a user interface 410, which coincides with an electronic document's location. This allows the user 405 to access webpages 500. In a preferred embodiment, as illustrated in FIG. 5, a webpage 500 comprises a parent-document 505. The parent-document 505 is the document encapsulated by the parent window of a user interface 410, wherein the parent-document 505 may contain various types of information, including, but not limited to, text, multimedia, etc.

A lead widget 510 may be defined as an application used inside of a webpage 500 that allows for a functional document to be loaded within the parent-document 505, wherein the functional document of the lead widget 510 stores user data 430A input therein within a user profile 430. The lead widget 510 may be embedded within the parent-document 505 and instruct the processor 220 to store user data 430A input therein within a user profile 430. In some embodiments, the lead widget 510 may also communicate with the system 400 in a way such that the system 400 may enter the customer into a sweepstakes 435 using the information input into the lead widget 510. The functional document of the lead widget 510 may perform tasks based on actions taken by a user 405. In a preferred embodiment, the lead widget 510 may be stored within the parent-documents 505 of the webpages 500, wherein the webpages 500 are stored within the network 150.

A vehicle finder application (VFA) may be defined as an application used inside of a webpage 500 that allows for a functional document to be loaded within the parent-document 505, wherein the functional document of the vehicle finder application 510 searches for vehicles using parameters set by a customer. The VFA comprises a database 115 and a server 110 that may process vehicle listings and transmit the results to the customer. The VFA may also comprise a user interface 410 that allows the customer to change search parameters and/or to contact a financial institution via a contact function. In one preferred embodiment, the contact function may also allow a customer to contact a dealer. The VFA may also comprise a sort tool, which may allow a customer to change the order in which the vehicles are displayed based on certain parameters. The webpages 500 generated by the VFA may comprise branding of a particular financial institution that customers may interact with to find vehicles and request financing for said vehicle from said financial institution. In a preferred embodiment, the VFA may generate a search results page (SRP) that shows matching vehicles based on the customer's search parameters. When the customer initiates a search using the VFA, they may be taken to the SRP. The SRP displays vehicle listings that match the search parameters submitted by the customer. The SRP also allows the customer to adjust their search parameters to find other vehicles or to narrow search results. The VFA may also check if a virtual test drive is available for each vehicle of the SRP. If a virtual test drive exists, the customer may select the virtual test drive in the user interface 410 for display. The customer may select any vehicle listing in the search results to see more details about that vehicle.

Financial institutions may also set parameters that narrow the search results returned to a customer. The parameters chosen by the financial institution may be saved as user data within a user profile. In a preferred embodiment, the VFA may check the parameters within the user profile 430 before returning any search results to a customer. For instance, a financial institution may set a number of parameters, including whether or not to disallow certain dealers in search results, select preferred dealers, or restrict results to approved dealers only. If the financial institution has any disallowed dealers, listings from these dealers may be filtered out of the search results by the VFA prior to returning the results to the SRP. If the financial institution has selected any preferred, the VFA may sort any matching listings from the preferred dealers to the top of the search results on the SRP. If the financial institution has selected any approved dealers, the VFA may restrict the search results on the SRP to only listings of the approved dealers, thus ignoring the disallowed dealers and preferred dealers.

The VFA may display all details and photos that are available for a particular vehicle on a vehicles details page (VDP). In a preferred embodiment, the VFA may search a database containing vehicle data 425 for each listing and create a VDP based on the vehicle data of a listing selected by a customer. Vehicle data may include, but is not limited to, vehicle year, make, model, body style, engine, drivetrain, transmission, price, price rating, depreciation estimates, and sales analysis, or any combination thereof. In some embodiments, vehicle data shown on the VDP may be notes from the seller of the vehicle, including name, address, contact information, and website, or any combination thereof. Therefore, vehicle data 425 may also include data pertaining to the seller of a particular listing. In one preferred embodiment, the system 400 may redact information on the VDP and replace it with an information request component. The information request component may appear to the customer in the webpage 400 as a clickable, blurred out version of the underlying information, which may then be clicked by the customer to reveal said underlying information.

In one preferred embodiment, when a customer selects the information request component within a webpage 500, the system 400 may send a request to the customer's computing entity to obtain the customer's user information, including a session identifier code. If the customer's computing entity returns the requested user information to the VFA, the VFA may use the session identifier code to determine if a customer has previously showed interest in a particular vehicle via selecting an information request component of the VDP. If the system 400 determines that a customer has shown prior interest, the VFA may store a record in the database 115 indicating that particular customer has requested the information behind an information request component of the listing. Once recorded, the VFA may perform a query to determine the underlying information behind the information request component. In a preferred embodiment, the underlying information may be acquired from the listing record of the system 400. The underlying information may then be returned to the VDP and displayed to the customer. If no user information is returned to the VFA, the VFA may return a message to the customer that indicates that they are not-authorized to view the underlying information. The VFA may then send a lead form to the customer's computing entity to obtain the user data 430A from the customer. Should a customer complete the lead form and submit it to the VFA, their details are processed as a lead, and the system 400 may retrieve and display the underlying information behind the information request component to the customer.

Within the SRP and VDP, a customer may submit a form to check the current availability of any vehicle and/or to check with the financial institution to determine whether or not financing is available for a vehicle in a particular listing. When the customer submits this form, the user data 430A within is taken by the server 110 of the VFA, which handles the customer as a lead and adds them to a list of leads within the system 400. In one preferred embodiment, the listings of the SRP may further comprise a "Find Better Price" button, which the user 405 may activate to trigger a find-better-price function of the system 400. The find-better-price function causes the server 110 of the VFA to query a current listings table of the system 400 to find other listings having similar vehicle data 425. In one preferred embodiment, the results may be sorted from lowest price to highest price and returned to the user 405 as a new SRP. In another preferred embodiment, the find-better-price function causes the system 400 to search the database 115 for listings having the same make, model, and year of the listing. In yet another preferred embodiment, the find-better-price function may search for listings having the same make and model but with different years of a listing. In yet another preferred embodiment, the find-better-price function may search for listings having information indicating similar mileage as the chosen listing. Matching listings are preferably sorted by lowest price first and displayed to the customer on a comparison page; however, a customer may choose to reorganize the data within the VFA using the sort tool.

In one preferred embodiment, the VFA may also calculate and/or display a monthly payment estimate for each listing of the SRP. In a preferred embodiment, the monthly payment is calculated by the VFA using a rate sheet of a financial institution stored in the user profile 430 within the database 115. In one embodiment, the SRP may contain a field that allows a customer to input a credit score, which may alter the monthly payment estimates displayed in the SRP. The VFA may also calculate cost of ownership for each listing, which may then be used to estimate the total monthly cost to own a vehicle on the SRP. In one preferred embodiment, the VFA may allow the customer to disable the inclusion of cost of ownership in the cost to own calculation.

The VFA may have a timer function, which automatically executes a vehicle import function on a regular basis. In a preferred embodiment, the timer function executes the vehicle import function daily, however, one with skill in the art will recognize that the timer function can be scheduled to execute the import function at an earlier or later time. The vehicle import function causes the server 110 of the VFA to connect to at least one vehicle listings database and retrieve vehicle data 425 pertaining to listings. The vehicle data 425 may then be used by the system 400 to generate listings tables that may be used for the various functions of the VFA.

In one preferred embodiment, the VFA may comprise a search widget that may be embedded on a financial institution's website, online banking platform, or mobile banking app. The search widget allows a customer to initiate a search for a vehicle from a webpage 500 of a financial institution's website. The search widget may comprise various selectors, wherein each selector allows a customer to choose a desired characteristic of a desired vehicle. For instance, the search widget may comprise a vehicle make selector, vehicle model selector, and vehicle condition selector, which allow a customer to choose the make and model of a vehicle as well as its alleged condition. The search widget may also comprise input boxes that may allow a customer to narrow search results to a certain area. For instance, the search widget may comprise a zip code input box and a distance selector that may allow a user to narrow the search results to within a certain distance of a particular zip code.

In a preferred embodiment, the selectors of the search widget are populated by the VFA. For instance, the vehicle make selector may be automatically populated with a list of all available makes/models. The VFA may do this via the server 110 checking its local cache to determine if the list of makes and models is stored there. If the local cache contains the list of all makes and models, the server 110 may encode this list in the JSON format and may send it to the customer's web browser. The client-side code on the customer's web browser may then decode the list of makes and models and use them to populate the make and model selectors in the search widget. If the server 110 determines the local cache does not have a list of all makes and models, the server 110 may communicate with a database 115 of the system 400 to load a list of all available makes and models. In a preferred embodiment, the makes and models are taken from the current listings table in the database 115. This list may then be stored in the local cache of the server 110 so that it may be retrieved.

Once the server 110 has stored the list in the local cache, the system 400 may then encode the list in the JSON format and send it to the customer's web browser. The client-side code on the customer's web browser may then decode the list of makes and models and use them to populate the make and model selectors in the search widget. When the customer selects a particular selector, the widget may display any corresponding information to the customer in a way that allows the customer to choose different parameters for a search. A search button of the search widget may instruct the VFA to search the database 115 for listings using the parameters set forth by the customer. Once the search button is selected by the customer, the selected parameters and a string code indicating which financial institution's website the customer is on are transmitted to the server 110. The server 110 then generates and returns the SRP and VDPs to the customer by communicating with the database 115 to load the data relevant to each page.

All requests from the customer's web browser to the server 110 include a financial institution code which identifies the particular financial institution from which the customer's request originates. The database 115 stores user data 430A for each financial institution set up to use the system 400, including, but not limited to, customized branding information, interest rate data, list of disallowed dealers, list of approved dealers, and list of preferred dealers. The search widget may also be configured to transmit to the server 110 a unique identifier for any customer using the widget. If a unique identifier is transmitted to the VFA with the search request, the server 110 may use the unique identifier as the session identifier for the customer. If no unique identifier is transmitted to the VFA, the server 110 may generate a random string of variables to use as the session identifier. In a preferred embodiment, the random string of variables comprises 24-characters. Regardless, the server 110 may include a code that stores the session identifier in the local session storage area of the customer's web browser when returning the SRP. In the future, this locally stored session identifier may be transmitted to the server 110 with search requests to allow the system 400 to track a customer's usage across a financial institution's website. When the system 400 is used to load a financial institutions website, it preferably uses the customized branding of the financial institution. In one preferred embodiment, the Server 110 uses CSS data stored in the user profile 430 of a financial institution when generating the SRP and VDP. This allows a financial institution to set the styling of the webpages 500 generated by the system 400.

In a preferred embodiment, the VFA creates a current listings table and a listing history table that the system 400 may use to populate the various webpages 500 generated the system 400, wherein the current listings table contains data on vehicles that are currently for sale and the listing history table contains data on all vehicles in which the system 400 has collected data. When the current listings are stored in current listings table, the VFA may perform a number of processing steps on the listing data. In one embodiment of a processing step, the system 400 may perform a query to determine whether or not each record in the current day's listings table has a corresponding record in the previous day's listings table. If not, the system 400 may make a note of the change in the listings history table. For instance, the system 400 may add a new listing record to the listings history table for any listing of the current day's listings table not found in the previous day's listings table. For any listing with a different price in the current listings table than in the previous day's listings table, the system 400 may add a price change record to the listing in the listings history table. For any listing in the previous day's listings table but not in the current listings table, the system 400 may add a listing removed record to the listing history table. In all cases, the record added to the listing history table includes the details of the vehicle being referenced.

In another preferred embodiment of a processing step, the VFA may perform a multiple linear regression analysis on all listings in the current day's listing table using a number of independent linear regression variables from each listing. These linear regression variables may include, but are not limited to, year, make, model, trim, body style, transmission, drivetrain, engine cylinder count, mileage, and state in which the vehicle is listed. The dependent variable being predicted by the linear regression is the price of the listing. In a preferred embodiment, the results of this linear regression analysis are a set of float-valued parameters, one for each independent variable. These float-valued parameters may be used by the system 400 to determine how much each component of each listing contributes to the average market price of each vehicle. The parameters of the multiple regression analysis are transmitted by the server 110 to the database 115 for storage in a price analysis table.

In yet another preferred embodiment of a processing step, a price rating analysis is calculated for each listing in the current listings table. Each listing is retrieved from the database 115 by the server 110. The server 110 may also retrieve the independent linear regression parameters to estimate the fair market retail value of the current listing. Once the fair market value is estimated, the VFA compares the actual price of the current listing to the fair market value and assigns the listing a price rating. The system 400 may then transform this price rating into an indicia that may indicate to a customer how good or bad a deal the listing price is compared to the fair market value as estimated by the VFA. In a preferred embodiment, the system 400 may display Great, Good, Fair, or Poor to a customer. In another preferred embodiment, the system 400 may highlight a particular listing with a certain color. For instance, a price rating representing a good deal may cause the system 400 to highlight a listing with a green color, whereas a price rating representing a bad deal may highlight a listing with a red color.

In yet another preferred embodiment of a processing step, the VFA may perform a set of regression analyses to determine typical depreciation rates for different models and makes. The server 110 may communicate with the database 115 to extract all distinct vehicle variables (such as year, make, model, and trim combinations) from the current listings table. For each distinct combination, a linear regression may be performed using the year of the vehicle as the independent variable and the price of the vehicle as the dependent variable. The resulting parameters are stored by the server 110 in the database 115. This process is repeated for every distinct year, make, and model combination in the current listings table. Finally, it is repeated again for each distinct year and make combination. The resulting regression parameters are stored in the database 115.

In yet another preferred embodiment of a processing step, the VFA may perform a sale time analysis to estimate how long each removed listing was on the market. The server 110 may request all new listings from the listing history table of the database 115, which is preferably grouped by distinct vehicle variables, including, but not limited to, make, model, trim, state, and price rating. For each distinct variable, the server 110 may determine when each listing in the group was sold by querying the listing history table for the corresponding removal record. The server 110 may then calculate how many days each listing was on the market. Finally, the server 110 calculates how many days it took for 90% of the listings for a given distinct variable to be sold. This data is stored in the database 115.

An integrated marketing system may be defined as a system 400 that allows financial institutions to market services to customers via social media and/or email. In a preferred embodiment, the IMS comprises a social media marketing system (SMMS) and an email marketing system (EMS). The SMMS allows financial institutions to promote vehicle buying, research, and education tools to their customers via social media platforms. For instance, once set up for a particular financial institution, the system 400 may automatically post messages to that financial institution's Facebook page that provides informative content about the vehicle research tools available on the Financial institution's website. The SMMS comprises a database 115 and a server 110. The database 115 stores the following a plurality of tables, including, but not limited to a client table, user table, access tokens table, shared posts table, client posts table, and modified posts table, or any combination thereof.

The client table contains a unique ID number for each customer and each customer's name. The user table contains a client ID associated with the customer, the username of the customer, and a cryptographically-hashed password. The access tokens table contains the client ID associated with each access token, a boolean-valued field storing the automatic-post status for the client, and an access token string. The shared posts table contains a unique ID for each shared post, a content string, a link URL string, an image URL string, a posting date and time, and a boolean-valued job-complete field. The client posts table contains for each post, a client ID referencing an ID from the clients table, a content string, a link URL string, an image URL string, a posting date, posting time, and a boolean-valued job-complete field. The modified posts table contains for each modified shared post indicator a client ID referencing an ID from the clients table and a shared post ID referencing an ID from the shared posts table.

In a preferred embodiment, the SMMS comprises an administrative setup user interface (ASUI) and a post management user interface (PMUI). A user 405 may access these interfaces through the server 110. The ASUI allows an administrative user to manage shared posts via the server 110. In a preferred embodiment, the ASUI initially presents a password entry form to the user 405. When the user 405 enters a password and activates a password check functionality, the form containing the entered password is sent to the server 110, wherein a query is performed by the system 400 to determine whether or not the entered password is correct. If the entered password is not correct, the server 110 may return an error message to the user 405. If the entered password is correct, the server 110 may return the shared post management view to the user 405. The server 110 may then communicate with the database 115 to get a list of all of the records in the shared posts table which have a posting date and time that corresponds with a later date. The details for each of these posts is displayed on the resulting webpage 500, which is displayed to the user 405 via the ASUI.

The user 405 may modify or delete any of the shared posts which are displayed by interacting with the ASUI to change the text, link URL, graphic, and/or post date/time. The user 405 may then save any made changes. In a preferred embodiment, a Save Changes button of the ASUI allows a user 405 to save any made changes. Once saved, the system 400 may send the changes to the server 110, which may then communicate with the database 115 to store the updated shared post record. In another preferred embodiment, the user 405 may select a Delete button associated with a post in the ASUI. The ID of the shared post is sent to the server 110, which then communicates with the database 115 to delete the record for that shared post. In either case, the server 110 returns an updated shared post management view which is then displayed to the user 405. The administrative user 405 can also add a new shared post, which is subsequently sent to the server 110 and database 115 to save it in the shared posts table.

The post management user interface (PMUI) allows financial institutions to access and manage their posts. When a user accesses the PMUI via the SMMS, the server 110 may present the user 405 with a login form. The user 405 may then enter credentials and submit the login form back to the server 110. The server 110 may then communicate with the database 115 and perform a query to determine whether the users table of the database 115 contains a username that matches the submitted username as well as a password hash that matches the hashed version of the submitted password. If a matching username and password hash exist, the server 110 may retrieve the corresponding client ID number associated with the user 405 from the database 115 and allow the user 405 to access the PMUI. If a matching username and password hash does not exist, the server 110 may return a webpage 500 with an error message to the user 405.

Once the server 110 has retrieved the client ID associated with the user 405, the server 110 may communicate with the database 115 to retrieve all client posts associated with that client ID having a future shared date as well as all shared posts having a future shared date. In a preferred embodiment, the system 400 may exclude shared posts having a modified shared post indicator record corresponding to the current client ID and shared post ID. For each shared post returned, the server 110 may perform a search and replace operation on post content. The system 400 may also link a URL string in order to replace any placeholder variables with user specific data. The resulting client posts and user specific shared posts may then be sorted by the server 110 and returned to the PMUI. In a preferred embodiment, the server 110 sorts the data in order from earliest post date/time to latest.

The user 405 may modify or delete any of the posts which are displayed in the PMUI by interacting with the PMUI to change the text, link URL, graphic, or post date/time. The user 405 may then save any changes by selecting a save function of the PMUI. In a preferred embodiment, the user 405 may press a Save Changes button of the PMUI to activate the save function. The save function sends any changes to the server 110. If the post ID of the post corresponds to a record in the client posts table, the server 110 may communicate with the database 115 to store the updated post record. If the post ID of the post corresponds to a record in the shared posts table, the server 110 may communicate with the database 115 to store a new record in the modified posts table. The server 110 may then communicate with the database 115 to store a new record in the clients post table, corresponding to the data submitted by the user 405.

To delete a post, the user 405 may select a delete function within the PMUI. In a preferred embodiment, the user 405 may select a Delete button within the PMUI, wherein the Delete button is associated with the post displayed within the PMUI. Selecting the delete function may send the post ID of the post to the server 110. If the post ID of the post corresponds to a record in the client posts table, the server 110 communicates with the database 115 to delete that post record. If the post ID of the post corresponds to a record in the shared posts table, the server 110 communicates with the database 115 to store a new record in the modified posts table. The user 405 may also add a new client post. New client posts are sent by the PMUI to the server 110, which subsequently transfers and stores the new client post within the database 115.

Once a post has been modified, the server 110 returns an updated post management view to the PMUI. In a preferred embodiment, the PMUI comprises a setup view that allows users 405 to set permissions for the server 110 and PMUI. The setup view is preferably accessed via a Setup button of the PMUI. When the user 405 accesses the setup view within the PMUI, the server 110 communicates with the database 115 to retrieve any access token records for the client ID associated with the user 405. If there are no access token records for a client ID, the server 110 may indicate to the user 405 that authorization must be setup for their social media platform. In a preferred embodiment, the setup view includes a third-party authorization widget provided by the social media platform. The user 405 may interact with the third-party authorization widget to authorize access. Once the user 405 authorizes access, the third-party authorization widget may provide an access token to the server 110, which then stores the access token in the database 115. If there are access token records, the server 110 may return a list of the social media platforms that have been set up.

In one preferred embodiment, the user 405 may select a delete function in the PMUI to delete an access token. This is preferably accomplished via a Delete button. The server 110 may then communicate with the database 115 to remove the access token. In one preferred embodiment, the server 110 has a timer that causes it to automatically execute an upload posts functionality. When the upload posts functionality is executed by the system 400, the server 110 may communicate with the database 115 to retrieve a list of all shared posts and all client posts having a post date/time predating the execution of the upload posts functionality. In a preferred embodiment, the system 400 may further check a job-complete Boolean field of a post. If the job-complete boolean field set to true, the system 400 may retrieve the post by accesses the database 115 to retrieve a list of all access token records which have their automatic-post boolean flag set to true. For each such access token, the server 110 may access the database 115 to retrieve the corresponding client record. The server 110 may then perform a search and replace operation on the post content and link URL string in order to replace any placeholder variables with user data 430A. This produces a list of shared posts, each customized with user data 430A for all of users 405 using automatic posting. The server 110 may then merge this list of posts with the list of client posts. For each post on this combined list, the server 110 may access whatever external social media platform API is associated with the access token record and subsequently send the post data and access token for that user 405. The server 110 may then update the client post records and shared post records to set their job-complete flag to true.

The email marketing system 400 (EMS) of the IMS is designed to assist a financial institution target customers who have used their services in the past with certain product offers and information. The EMS may also assist financial institutions target existing customers as well as new customers. The EMS comprises a database 115, server 110, and email marketing user interface (EMUI). In a preferred embodiment, the database 115 of the EMS may be used to save a financial institution table, customer table, email template table, email lists table, scheduled email table, email addresses table, email response table, and an email removal table.

The financial institution table contains a unique ID number for each user 405, each username, user phone number, and user email address. The customers table contains the user ID which the customer is associated with, the VIN of the vehicle which the customer financed with the financial institution, the date the vehicle was financed, and the term of the loan in months. The email templates table contains, for each template, the HTML for the email and a suggested subject for the email. An email lists table, containing a unique ID for each email list, the client ID for the user 405 that owns the list, and a name for the list. The scheduled email table contains a unique ID for each scheduled email, list ID for the list that the email will be sent to, email subject line, email send date, email send time, integer valued field recording the number of individual emails sent, integer valued field containing the number of bad emails reported, send status field, and a string containing the HTML contents of the email. The email addresses table contains a unique ID for each email address, a list ID indicating which email list the email address is on, and a string field containing the individual email address. The email responses table contains the ID of the scheduled email to which each record is a response, the ID of the email address that responded, the type of response, and the date and time of the response. The email removal table contains a string of the email address that was removed, a reason field indicating why the email was removed (Bounced, Spam Report, or Unsubscribed), the date of removal, and time of the removal.

The server 110 of the EMS has an automatic import feature, which may be configured by the user 405 to import data concerning new customers. The user data 430A of the customers may then be sent by the server 110 to the database 115 for storage in the customers table. When the system 400 imports a list of customers, it creates a new record in the email lists table. It then stores each customer's email address and personal information in the email addresses table. The ID of the list is associated with each address added to the addresses table. The EMUI allows users 405 to schedule emails and view results of sent emails. In one preferred embodiment, users 405 may access the EMUI via the PMUI. Once a user 405 accesses the EMUI, the user 405 is shown a list of the emails that they have previously sent to leads, which is retrieved by the system 400 from the scheduled emails table. The user 405 may also access a list of available email templates using the EMUI, which the system 400 loads from the email templates table in the database 115. In a preferred embodiment, each email template may contain placeholder variables such as % NAME % or % PHONE %. When displaying or sending out an email based on a particular template, the server 110 loads the user data 430A from the financial institution table and replaces the placeholder variables with the user data 430A for the financial institution.

A financial institution may choose which templates to be sent to a customer. To do this, a user 405 may select a template and then select within the EMUI a date and time in which the template will be sent. In a preferred embodiment, the user 405 may select to send a template to an email list, which can be filtered based on the data in the customer records table. For instance, a user 405 may choose to send a template to only customers of a list that originated from an indirect loan. For instance, a user 405 may choose to send a template to customers of a list based on the number of payments remaining on the customer's last vehicle loan. The system 400 may then store which templates will be sent to which customers in the scheduled emails table. In one preferred embodiment, the server 110 may comprise a timer function that causes an email sending function to execute. The email sending function works by performing a query to determine whether the scheduled emails table contains any records that have a send date/time predating the execution of the email sending function and a Boolean field to Unsent.

In a preferred embodiment, the server 110 processes the email addresses on the list in batches of varying size. In between batches, the server 110 may pause sending the emails for a fixed period of time. The reason for these pauses is that if an email is sent to an invalid email address, it will bounce back with an error, which typically arrive back at the system 400 several seconds after an email has been sent. By preventing sending out too many emails to addresses that are invalid, email service providers are less likely to block the server 110 from sending emails due to too sending too many emails to invalid addresses. Every time the server 110 receives a bounce notice, it increments a bad email counter in the scheduled email table for the scheduled email record that the bad email was sent to. After the pause between sending batches of emails, the server 110 checks the bad email counter in the scheduled email table for the email it is processing. If the value of the bad email counter is higher than a set percentage of the size of the email list to which the current email is being sent, the server 110 halts the sending of the email and records a status of Halted in the scheduled email table for that email. Otherwise the next batch of emails is sent out. In a preferred embodiment, if the system 400 determines that more than 10% of emails sent out by the system 400 are returned, a system 400 will halt sending emails. This process continues until all of the email addresses on the list have been processed. In a preferred embodiment, a pause of one minute occurs between batches.

When processing each scheduled email record, the server 110 may perform a query to determine the corresponding email address from the email address table. The email removals table is then checked for each corresponding email address to determine whether or not that email address has been removed. If the email address is not in the email removals table, the server 110 may connect to an external mail server 110 and transmit the email message to that email address. The server 110 may then monitor the sent count field for the current email's record in the scheduled table. In a preferred embodiment, each sent email contains a tracking <img> tag, which allows tracking of the email.

For instance, when a customer views an email sent by the system 400, the customer's email client requests the <img> from the server 110 using the URL of the image. When the server 110 receives the request for the image from the customer's email client, it parses the requested URL and extracts the embedded email ID. The server 110 then transmits an email opened tracking record corresponding to that email ID to the database 115, where it is stored in the email responses table. For instance, the server 110 may parse each <a> HTML tag in each sent email and modify the existing URL with a tracking URL that points to a tracking and redirection endpoint. When a customer clicks on a tracking URL of the email, the tracking URL is accessed by the customer's computing entity. The server 110 then transmits a link clicked record corresponding with that email ID to the database 115, where it is stored in the email responses table. The server 110 may then send a redirection HTTP response to the customer's computing entity to direct them to the original URL of the link.

After all email addresses on the list have been processed, the server 110 updates the emails scheduled table by changing the Boolean field statuses to Sent. In a preferred embodiment, the user 405 may access a list of sent emails and view a report about each one in the EMUI. The server 110 may generate the list of sent emails by querying the database 115 to extract all emails from the scheduled emails table. In a preferred embodiment, the server 110 only returns emails of the scheduled emails table that contain a Boolean filed status of Sent or Halted. To generate a report about a particular sent email, the server 110 may query the database 115 and parse the email responses table to determine which of the customers opened or clicked on links in the sent email. In a preferred embodiment, this information may be displayed in the EMUI or presented to the user 405 via a webpage 500.

To prevent un-authorized users 405 from accessing other user's 405 information, the system 400 may employ a security method. As illustrated in FIG. 6, the security method of the system 400 may comprise a plurality of permission levels 600 that may grant users 405 access to user content 615, 635, 655 within the database 115 while simultaneously denying users 405 without appropriate permission levels 600 the ability to view user content 615, 635, 655. To access the user content 615, 635, 655 stored within the database 115, users 405 may be required to make a request via a user interface 410. Access to the data within the database 115 may be granted or denied by the processor 220 based on verification of a requesting user's 605, 625, 645 permission level 600. If the requesting user's 605, 625, 645 permission level 600 is sufficient, the processor 220 may provide the requesting user 605, 625, 645 access to user content 615, 635, 655 stored within the database 115. Conversely, if the requesting user's 605, 625, 645 permission level 600 is insufficient, the processor 220 may deny the requesting user 605, 625, 645 access to user content 615, 635, 655 stored within the database 115. In an embodiment, permission levels 600 may be based on user roles 610, 630, 650 and administrator roles 670, as illustrated in FIG. 6. User roles 610, 630, 650 allow requesting users 605, 625, 645 to access user content 615, 635, 655 that a user 405 has uploaded and/or otherwise obtained through use of the system 400. Administrator roles 670 allow administrators 665 to access system 400 wide data.

In an embodiment, user roles 610, 630, 650 may be assigned to a user 405 in a way such that a requesting user 605, 625, 645 may view user profiles 430 containing user data 430A via a user interface 410. In an embodiment, the system 400 may be configured to send a financial institution a notification indicating that a new user profile 430 has been created. To access the data within the database 115, a user 405 may make a user request via the user interface 410 to the processor 220. In an embodiment, the processor 220 may grant or deny the request based on the permission level 600 associated with the requesting user 605, 625, 645. Only users having appropriate user roles 610, 630, 650 or administrator roles 670 may access the data within the user profiles 430. For instance, as illustrated in FIG. 6, requesting user 1 605 has permission to view user 1 content 615 and user 2 content 635 whereas requesting user 2 625 only has permission to view user 2 content 635. Alternatively, user content 615, 635, 655 may be restricted in a way such that a user may only view a limited amount of user content 615, 635, 655. For instance, requesting user 3 645 may be granted a permission level 600 that only allows them to view user 3 content 655 related to their specific financial institution but not user 3 content 655 related to other financial institutions. In the example illustrated in FIG. 6, an administrator 665 may bestow a new permission level 600 on users so that it may grant them greater permissions or lesser permissions. For instance, an administrator 665 may bestow a greater permission level 600 on other users so that they may view user 3's content 655 and/or any other user's content 615, 635, 655. Therefore, the permission levels 600 of the system 400 may be assigned to users 405 in various ways without departing from the inventive subject matter described herein.

Figure 7:
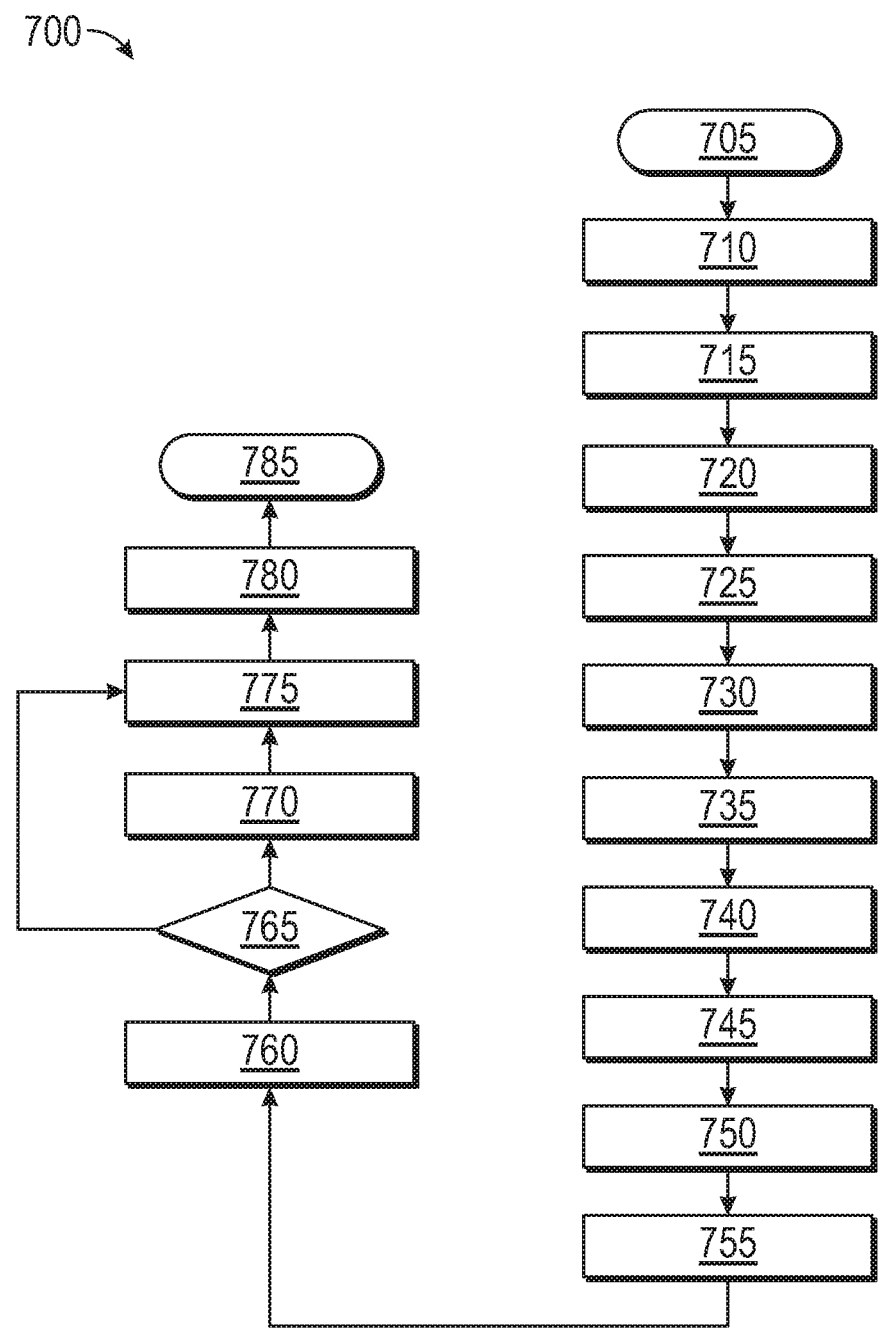
FIG. 7 is a flow chart illustrating certain method steps of a method embodying features consistent with the principles of the present disclosure.

FIG. 7 provides a flow chart 700 illustrating certain, preferred method steps that may be used to carry out the method of creating targeted customer lists and generating an offer ID that may be used to create offer emails. Step 705 indicates the beginning of the method. During step 710 a user 405 may upload a spreadsheet containing user data 430A, which may then be parsed by the processor 220 into an internal data structure during step 715. Once the spreadsheet has been parsed, the processor 220 may generate a multi-character alpha numeric string called a User ID and associate said alpha numeric string with the user data 430A during step 720. In a preferred embodiment, the alpha numeric string comprises sixteen characters. The processor 220 may then communicate the user data 430A and associated alpha numeric string to the server 110 and/or database 115 during step 725. In another preferred embodiment, the processor 220 may save the user data 430A and associated alpha numeric string to the non-transitory computer-readable medium 415 of the computing entity 200. The system 400 may create a targeted customer list having a unique ID during step 730 and subsequently assign the unique ID of the targeted customer list to each user profile 430 that is to be targeted by the system 400 during step 735.

Once the targeted customer lists have been created by the system 400, the user 405 may select a targeted customer list and input sweepstakes data 435A via the user interface 410 during step 740. The sweepstakes data 435A and targeted customer list may then be transmitted to the server 110 during step 745. Once the server 110 has received the sweepstakes data 435A and targeted customer list, the system 400 may generate a vehicle upgrade offer for each targeted customer on the list during step 750. In a preferred embodiment, the user 405 may select which targeted customers within a targeted customer list may receive a vehicle upgrade offer. The system 400 may then determine a targeted customer's vehicle by decoding any user data 430A associated with the targeted customer during step 755. In a preferred embodiment, the system 400 uses a VIN to determine a targeted customer's vehicle, wherein the VIN is passed to a third-party VIN decoding service via the network. The third-party VIN decoding service may then parse and return to the system 400 the year, make, and model that corresponds to the targeted customer's VIN.

Depending on the results of the check of step 755, the system 400 may take an action during step 760. If the system 400 is unable to determine the targeted customer's vehicle, the system 400 may proceed to step 770. If the system 400 is able to determine the targeted customer's vehicle, the system 400 may search a database 115 having vehicle data 425 for the newest model of the targeted customer's vehicle during step 765. In one preferred embodiment, the system 400 may terminate the method if the targeted customer's vehicle has no new models within the past two years. In another preferred embodiment, the system 400 may search for vehicles that are similar to the targeted customer's vehicle, wherein the system 400 may recommend vehicles that are similar to the targeted customer's vehicle should the system 400 be unable to find a newer model of the targeted customer's vehicle than what is in the user profile 430. Once the system 400 has determined the newest model of the targeted customer's vehicle, the system 400 may proceed to step 770 wherein the server 110 may transmit the newest model of the targeted customer's vehicle to the database 115 server 110 to be stored within the user profile 430. The system 400 may then generate a multi-character alpha numeric string called an Offer ID and associate said Offer ID with the sweepstakes data 435A, vehicle data 425, and user data 430A during step 775. In a preferred embodiment, the alpha numeric string comprises 16 characters. Once the Offer ID has been created and stored within the database 115, the method may proceed to the terminate method step 780.

Figure 8:
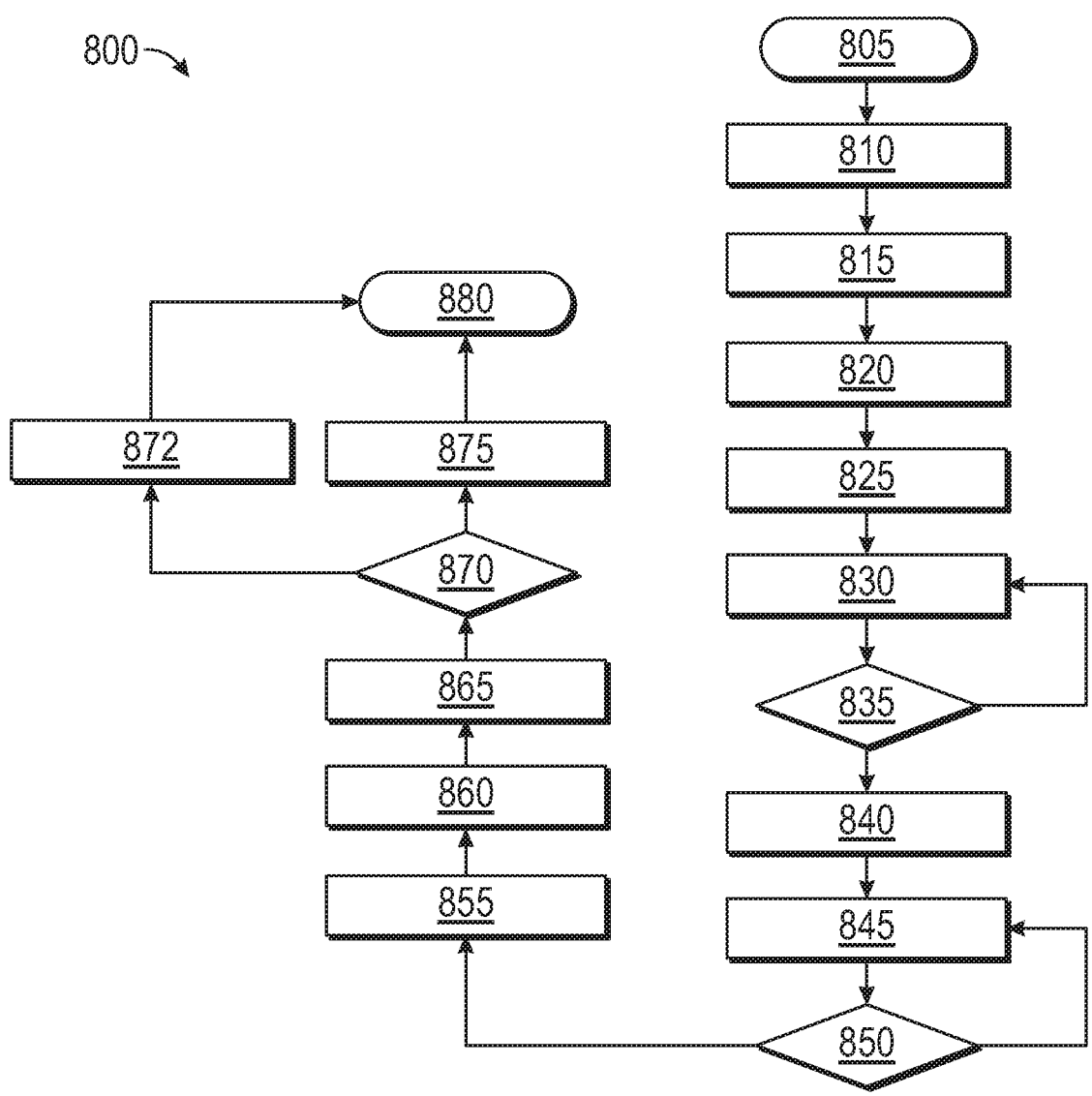
FIG. 8 is a flow chart illustrating certain method steps of a method embodying features consistent with the principles of the present disclosure.

FIG. 8 provides a flow chart 800 illustrating certain, preferred method steps that may be used to carry out the method of generating offer emails and sending them to targeted customers. Step 805 indicates the beginning of the method. During step 810 the computing entity may retrieve from the database 115 a targeted customers list. The user 405 may select within the user interface 410 an email template that may be used to generate the offer emails during step 815. In a preferred embodiment, the offer email contains the sweepstakes data 435A, user data 430A, and vehicle data 425 in a way such that the offer email confers to the customer that they are eligible for an auto loan and a sweepstakes 435 hosted by the financial institution. In another preferred embodiment, the template may include a link to the newest model of the targeted customer's vehicle. In another preferred embodiment, the template may contain an unsubscribe link, which the targeted customer may select to no longer receive emails from the system 400. Once the template has been selected by the user 405, the system 400 may place a tracking <img> tag within the offer emails HTML during step 820, wherein the tracking <img> tag contains the offer ID associated with the targeted customer in which the email is to be sent. The system 400 may then send the offer emails to the targeted customers during step 825.

During step 830, the server 110 may perform a check to determine if targeted customers have viewed the offer emails sent by the system 400 by determining whether the targeted customers' email clients have requested the URL of the image within the tracking <img> tag. Based on the results of the check, the system 400 may perform an action during step 835. If the system 400 has received a request for the <img> from a targeted customer's email client, the system 400 may return to step 830 and continue to check for a request. If the server 110 has received a request for the <img> from a targeted customer's email client, it may parse the requested URL and extract the offer ID within during step 840. The server 110 may then communicate with the database 115 during step 845 and perform a check to determine whether a targeted customer has selected a vehicle portal link within the offer email by determining whether the vehicle portal URL has been requested. Based on the results of the check, the system 400 may perform an action during step 850. If the vehicle portal link has not been requested, the method may return to step 845, wherein the system 400 may continue to check for whether or not the link to the newest model of the targeted customer's vehicle has been requested. If the link has been selected, the server 110 may parse the vehicle portal URL to determine the offer ID during step 855. The server 110 may then communicate with the database 115 to store a "portal open" record within the user profile 430 that corresponds to that particular offer ID during step 860. The server 110 may then perform a query to determine whether or not the system 400 was able to find a newer version of the targeted customer's vehicle during step 865. Based on the results of the query, the system 400 may take an action during step 870. If no newer version of the targeted customer's vehicle is found, a generic vehicle upgrade page may be generated for the user 405 during step 872. If a newer version of the targeted customer's vehicle is found, the system 400 may generate a vehicle upgrade page using the vehicle data 425 that matches the associated offer ID during step 875. In a preferred embodiment, the vehicle upgrade page contains the website 420 lead widget 510 as well as information including, but not limited to, marketing about the new vehicle, how to obtain financing for the new vehicle, how to purchase that vehicle from a local dealer, and provide a viewable video about the new vehicle. Once the system 400 has generated the vehicle upgrade page, the system 400 may proceed to the terminate method step 880.

Figure 9:
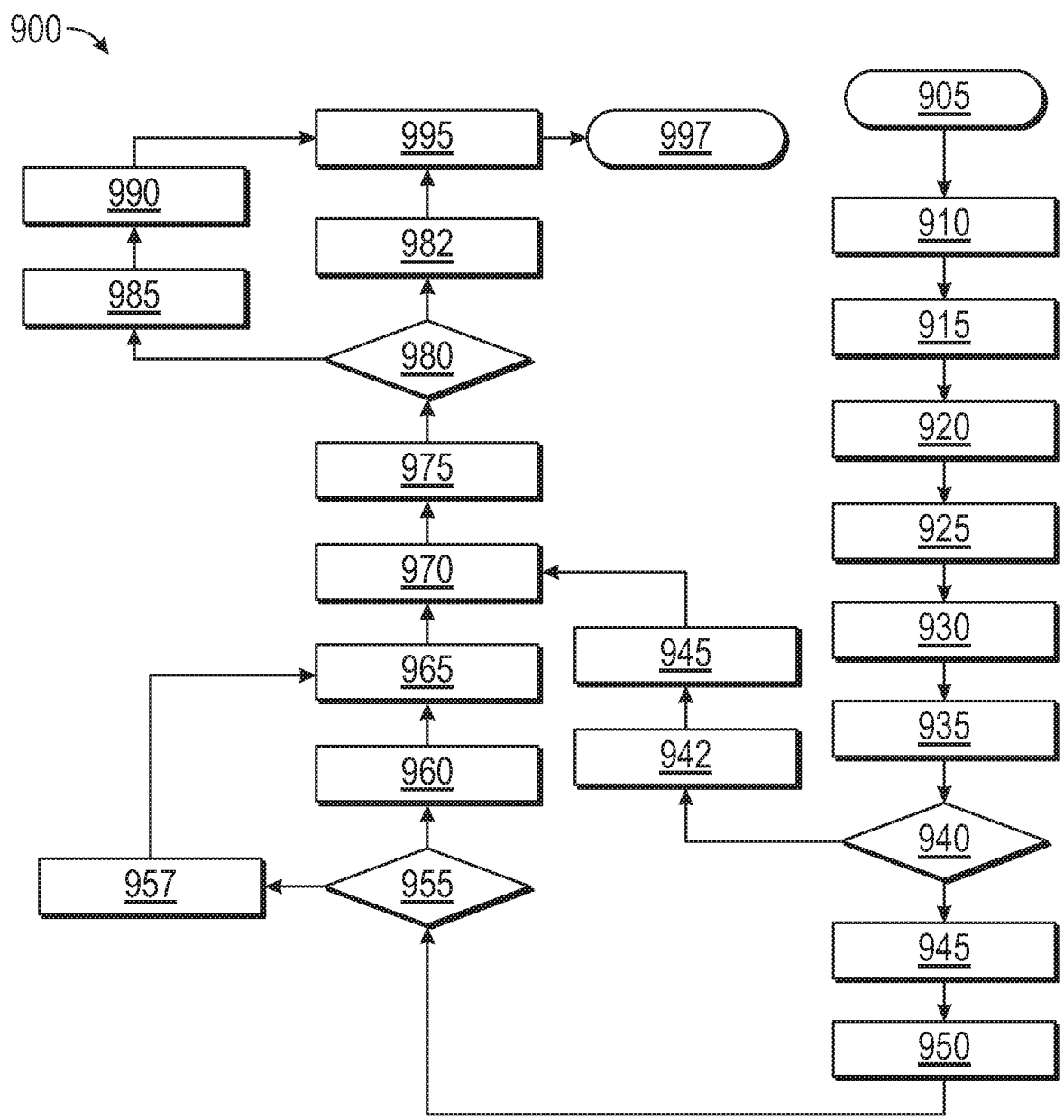
FIG. 9 is a flow chart illustrating certain method steps of a method embodying features consistent with the principles of the present disclosure.

FIG. 9 provides a flow chart 900 illustrating certain, preferred method steps that may be used to carry out the method of inputting user data 430A and creating user profiles 430 using a lead widget 510. Step 905 indicates the beginning of the method. During step 910 a customer may input user data 430A into a lead widget 510 embedded within a webpage 500 of the financial institution, wherein said user data 430A is subsequently transferred to the database 115 by the processor 220 during step 915. In one preferred embodiment, the user data 430A is transmitted to the server 110 before being transmitted to the database 115. The user interface 410 may request the <script> tag from the server 110 at the URL of the source link when any webpage 500 on the website 420 loads in the customer's browser during step 920. The server 110 may then parse the request URL to determine which webpage 500 the request corresponds to using the WEB_ID of the <script> tag during step 925. In a preferred embodiment, the web browser sends the URL of the webpage 500 on which the <script> tag is being loaded as part of the HTTP Referrer header. In another preferred embodiment, the user interface 410 also transmits stored cookies to the server 110.

The server 110 reads the HTTP Referrer header from the web browser to determine which webpage 500 on the client's website 420 the customer is currently accessing during step 930. The server 110 may then communicate with the database 115 and perform a query to determine if a corresponding website 420 record matches the WEB_ID and whether the URL regular expression matches the HTTP Referrer header during step 935. Based on the results of the query, the system 400 may take an action during step 940. If the database 115 has a matching webpage 500 record for the website 420, the widget parameters may be returned to the server 110 during step 945. The server 110 may then perform a query to determine the type of lead widget 510 based on the widget parameters during step 950. Based on the results of the query, the server 110 may take an action during step 955. If the lead widget 510 type is an embedded lead widget 510, the database 115 may return to the server 110 a record that indicates where on the webpage 500 to embed the lead widget 510 during step 957. In a preferred embodiment, this is specified using a CSS selector string: https://developer.mozilla.org/en-US/docs/Learn/CSS/Introduction_to_CSS/Selectors. If the lead widget 510 type is Triggered, the database 115 may return a record that indicates what customer action triggers the script and what code to execute to display the lead widget 510 when the action is triggered during step 960. Once the type of lead widget 510 has been determined and the appropriate file returned to the server 110, the system 400 may generate a corresponding JavaScript file from a prebuilt template during step 965. In a preferred embodiment, the JavaScript template that is generated by the system 400 depends on various factors which the system 400 must take into account, including, but not limited to, the type of lead widget 510, the UUID of the user 405, and the third-party advertising network configuration in the database 115.

If the database 115 has no matching webpage 500 record, a value of null is returned to the server 110 during step 942. If the server 110 receives a null value from the database 115, the server 110 may transmit an empty string to the customer's web browser during step 945. The server 110 may then transmit the generated JavaScript file or null response to the customer's web browser during step 970. When the server 110 returns the generated JavaScript file or empty string back to the customer's web browser, the system 400 may perform a query to determine whether or not the web browser sent a Session cookie with its initial request during step 975. Based on the results of the query, the system 400 may take an action during step 980. If a Session cookie was sent by the web browser, the system 400 may make the string value of that cookie the customer's unique identifier (UUID) during step 982. If a Session cookie was not sent, the server 110 may generate a random unique UUID consisting of a long string of alphanumeric characters during step 985. This random UUID is returned in a Session cookie using the Set-Cookie header of the web browser during step 990. This will cause the system 400 to store the UUID in a cookie and send it to the server 110 in any future requests. The server 110 then may communicate with the database 115 and save a record of the UUID during step 995, which will allow the system 400 to track which customers visit which webpages 500. Once a record has been created during step 995, the system 400 may proceed to the terminate method step 997.

In one preferred embodiment, the server 110 may be configured to display the lead widget 510 only once for each customer in a given time period. If the system 400 is configured this way, the server 110 will communicate with the database 115 to retrieve the timestamp of the most recent record corresponding to the UUID and loaded script. If the system 400 determines there is no such record, the system 400 may generate the lead widget 510 as normal. If the database 115 such record does exist, the application server 110 may check the timestamp to determine if it is within a given time interval. If the timestamp is outside the given time interval, the lead widget 510 may be generated by the system 400 as normal. If the timestamp is within the given time interval, the system 400 may return an empty string to the application server 110 so that the lead widget 510 will not appear on the website 420. In another preferred embodiment, the server 110 may be configured to deliver third-party advertising network tracking cookies to the user's 405 web browser when the lead widget 510 is displayed. This functionality allows the specific users who access the website 420 to be targeted for ads on third-party advertising networks such as Google and Facebook. Alternatively, the lead widget 510 may deliver third-party advertising network tracking when the user 405 submits the sweepstakes 435 entry form using the lead widget 510.

Figure 10:
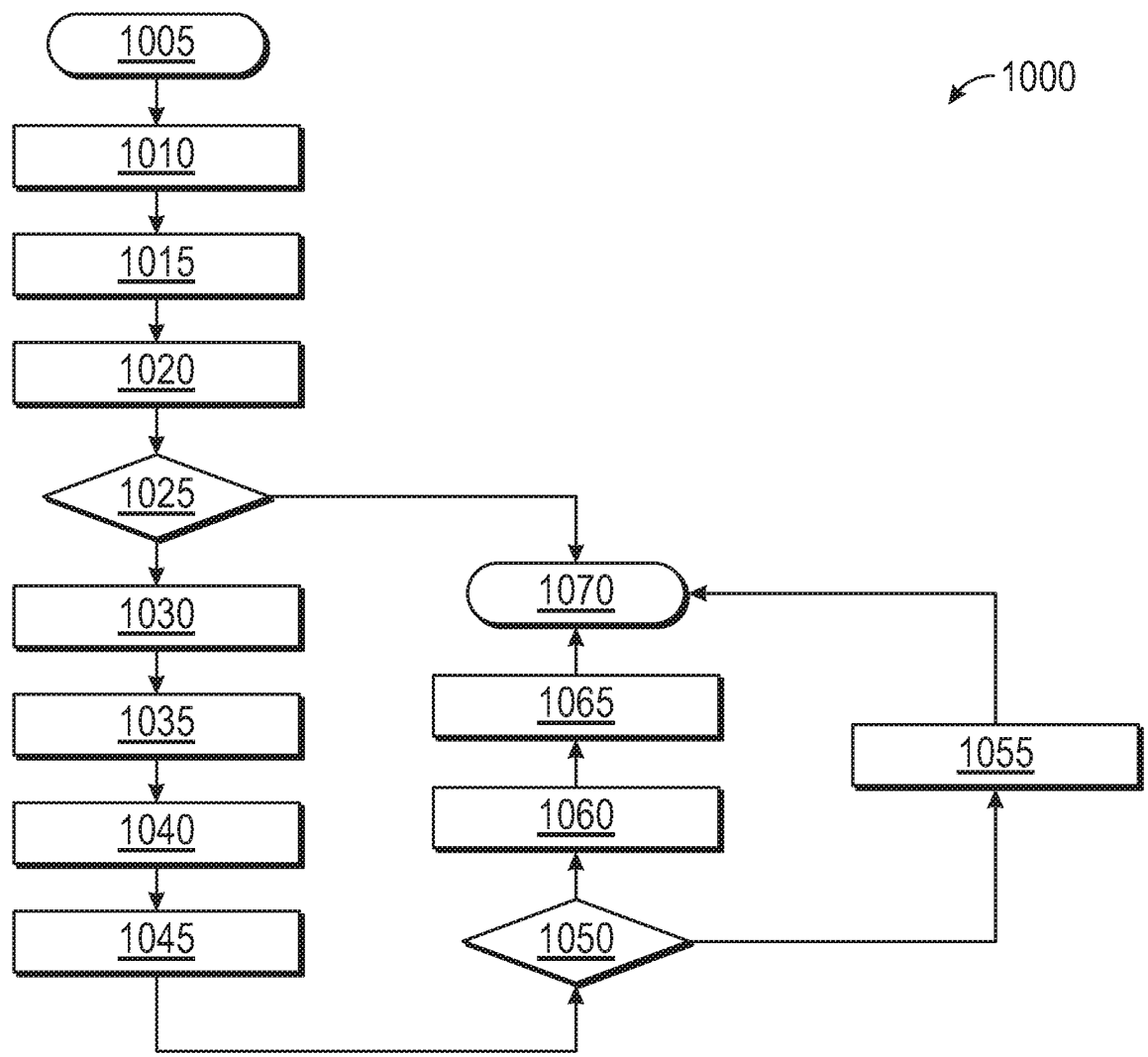
FIG. 10 is a flow chart illustrating certain method steps of a method embodying features consistent with the principles of the present disclosure.

FIG. 10 provides a flow chart 1000 illustrating certain, preferred method steps that may be used to carry out the method of generating a rule page and entry form for a sweepstakes 435. Step 1005 indicates the beginning of the method. During step 1010 a customer 405 may access a user interface 410 that may be used to submit entries over the network that communicates with the server 110. In a preferred embodiment, the user interface 410 for submitting entries consists of an HTML form with first name, last name, email address, and phone number input fields 515. This user interface 410 also preferably contains a link to view the rules and disclaimers. When the server 110 receives a request from a user 405 to view a sweepstakes 435 entry page, the server 110 communicates with the database 115 to retrieve details about any currently running sweepstakes 435 during step 1015. The system 400 may then perform a query during step 1020 to determine whether or not a sweepstakes 435 is currently being held. Based on the results of this query, the system 400 may perform an action during step 1025. If the database 115 does not contain a record about a currently running sweepstakes 435, the server 110 may return a webpage 500 to the user 405 with a message indicating that no sweepstakes 435 is currently available during step 1027 before subsequently proceeding to the terminate method step 1070. If the database 115 does contain a record indicating that a sweepstakes 435 is currently running, it may return the ID of the sweepstakes 435 as well as the prize and entry deadline to the server 110 during step 1030. The server 110 may then generate a webpage 500 containing this information as well as the entry form and then returns this page to the user 405 during step 1035. In one preferred embodiment, a link to the rules page is embedded with the sweepstakes 435 ID. If the user 405 accesses the rules page for a given sweepstakes 435 ID, the server 110 may communicate with the database 115 to retrieve information about the sweepstakes 435 corresponding to that particular sweepstakes 435 ID during step 1040. The system 400 may then perform a query to determine whether the sweepstakes 435 exists during step 1045. Based on the results of the query, the system 400 may perform an action during step 1050. If no such sweepstakes 435 exists, an error page is returned to the user interface 410 during step 1055, and the system 400 subsequently proceeds to the terminate method step 1070. If the sweepstakes 435 does exist, the server 110 may generate a rules page using a standard template sweepstakes data 435A during step 1060 and subsequently transmit the entry form to the processor 220 during step 1065. Once the form has been sent to the processor 220, the system 400 may proceed to the terminate method step 1070.

Figure 11:
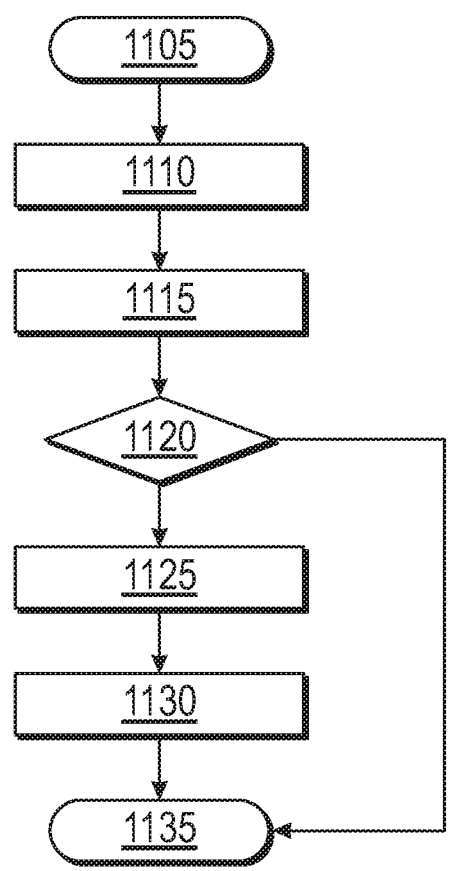
FIG. 11 is a flow chart illustrating certain method steps of a method embodying features consistent with the principles of the present disclosure.

FIG. 11 provides a flow chart 1100 illustrating certain, preferred method steps that may be used to carry out the method of filling out an entry form for a sweepstakes 435. Step 1105 indicates the beginning of the method. During step 1110, customers may enter the sweepstakes 435 by filling out fields 515 of the entry form and then submitting it using a function of said entry form. Once the form has been sent to the server 110, the server 110 may perform a query to determine if the information submitted by the customer matches information received within a certain time period during step 1115. Based on the results of this query, the system 400 may take an action during step 1120. If an entry form with similar information has been received within a given time period, the server 110 may return an error page to the user 405 and subsequently proceed to the terminate method step 1135. If an entry form has different information and has been received outside a given time period, the database 115 may create an entry record associated with the sweepstakes 435 and record the customer's submitted information during step 1125. For instance, if an entry form with either the submitted email address OR the submitted phone number has been received in the last 24 hours, the system 400 may return an error page. Once the server 110 has recorded the information, the server 110 may return a successful entry notification page to the user 405 during step 1130. The method may then proceed to the terminate method step 1135.

Figure 12:
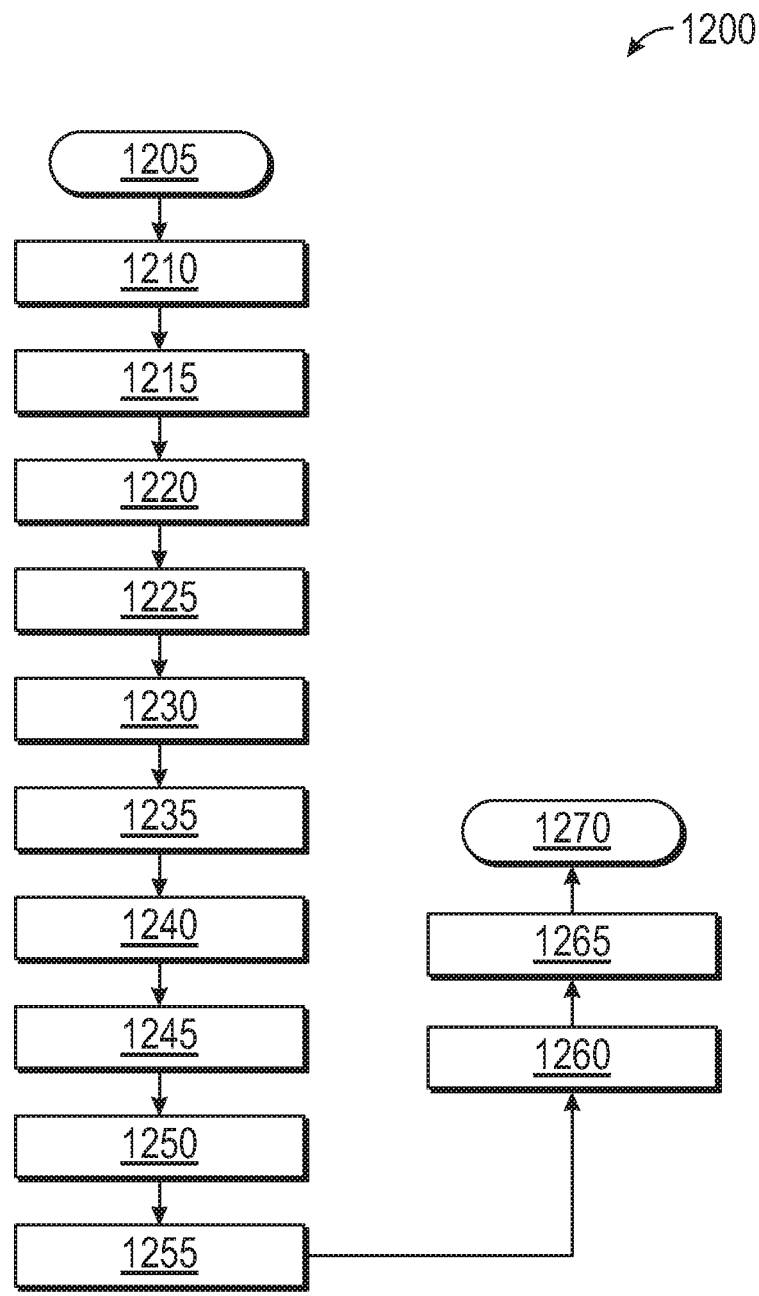
FIG. 12 is a flow chart illustrating certain method steps of a method embodying features consistent with the principles of the present disclosure.

FIG. 12 provides a flow chart 1200 illustrating certain, preferred method steps that may be used to carry out the method of selecting a winner of a sweepstakes 435. Step 1205 indicates the beginning of the method. During step 1210, a user 405 may access sweepstakes data 435A using a user interface 410. Once the user 405 has accessed the sweepstakes data 435A, the user 405 may be prompted to log in using credentials that would give the user 405 access via permission levels 600 during step 1215. Once the user 405 has logged in, the system 400 may communicate with the database 115 to retrieve a sweepstakes list 435B containing all active sweepstakes 435 that have been created by the system 400 during step 1220. Once retrieved, the system 400 may present the sweepstakes list 435B to the user 405 during step 1225. The user 405 may then select one of the sweepstakes 435 from the list during step 1230. The server 110 may then communicate with the database 115 to recover sweepstakes data 435A (prize amount, entry deadline, entrants) during step 1235 based on the selected sweepstakes 435. The server 110 may then generate a sweepstakes summary page listing all of this information during step 1240, wherein the user 405 may select a link to download the sweepstakes data 435A in the form of a sweepstakes document during step 1245. In a preferred embodiment, the sweepstakes document is a spreadsheet. When the user 405 selects the link to generate the sweepstakes document, the system 400 may generate the sweepstakes document during step 1250, wherein the sweepstakes document has a winner selection function that chooses a winner using the date input by the user 405. Once the user 405 has downloaded the sweepstakes document, the user 405 may then input the date into the sweepstakes document during step 1255. The system 400 may then execute the winner selection function to select a winner during step 1260, and subsequently save the modified sweepstakes document containing the winner during step 1265. Once the system 400 has saved the modified sweepstakes document, the method may proceed to the terminate method step 1270.

Figure 13:
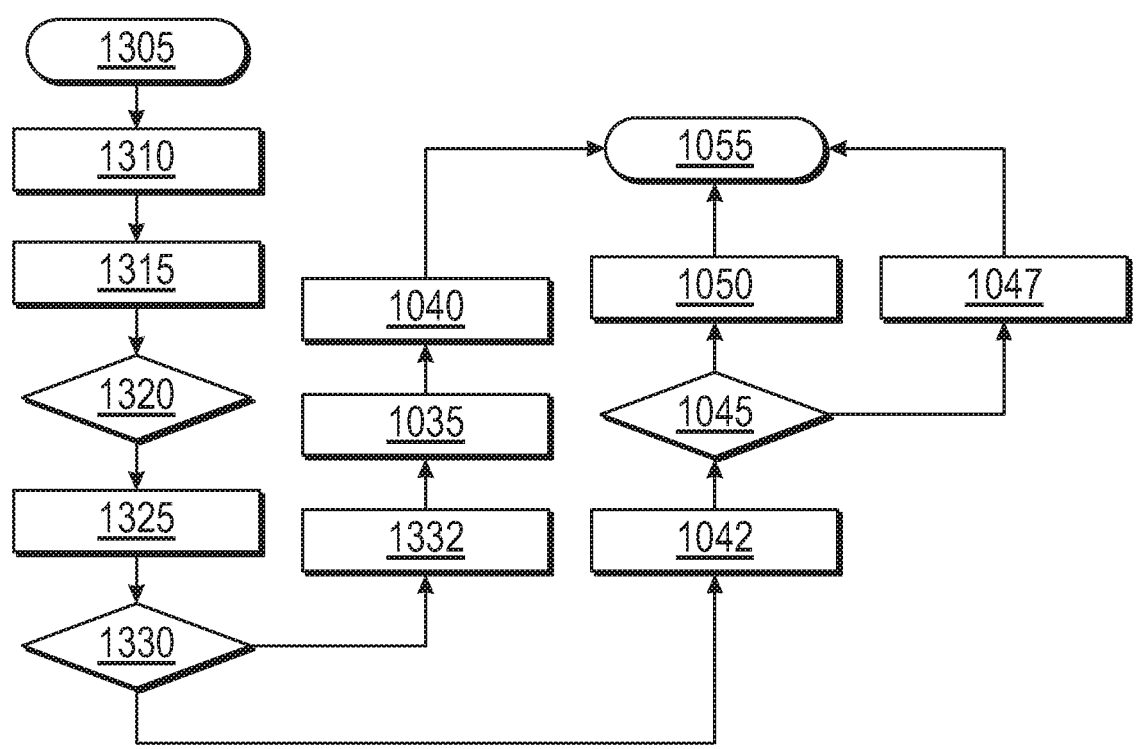
FIG. 13 is a flow chart illustrating certain method steps of a method embodying features consistent with the principles of the present disclosure.

FIG. 13 provides a flow chart 1300 illustrating certain, preferred method steps that may be used to carry out the method of determining whether or not a customer should be added to the lead email list. Step 1305 indicates the beginning of the method. During step 1310, the server 110 may receive user data 430A from a user interface 410, wherein the server 110 may then perform a query to determine whether all required fields 515 have been input during step 1315. In a preferred embodiment, required fields 515 include, but are not limited to, first name, last name, and email address. Based on the results of this query, the system 400 may take an action during step 1320. If all required fields 515 have not been input, the method may proceed to the terminate method step 1055. If all required fields 515 have been input, the server 110 may perform a query to determine if the customer already has a user profile 430 during step 1325. Based on the results of this query, the system 400 may take an action during step 1330. If a customer does not have a user profile 430 in the database 115, the database 115 may return a null response to the application server 110 during step 1032. If the customer already has a user profile 430, the database 115 may return the timestamp of when the user profile 430 was last recorded to the server 110.

If the system 400 received a null response from the database 115, the server 110 may transmit the user data 430A to the database 115 during step 1035 such that the database 115 may create a new user profile 430 from the user data 430A during step 1040. If the server 110 receives a timestamp back from the database 115, the system 400 may perform a query during step 1042 to determine whether or not the timestamp occurred within a given time period. In a preferred embodiment, a time period of twenty-four hours is used. Based on the results of this query, the system 400 may take an action during step 1045. If the timestamp has occurred within the given time period, the system 400 may consider the user contact information to be a duplicate request and return a duplicate data error response during step 1047. The system 400 may then proceed to the terminate method step 1055. If the timestamp has not occurred within the given time period, the server 110 may add the customer to the lead recipients email list within the database 115 during step 1050. Once the customer has been added to the email list, the system 400 may proceed to the terminate method step 1055.

Figure 14:
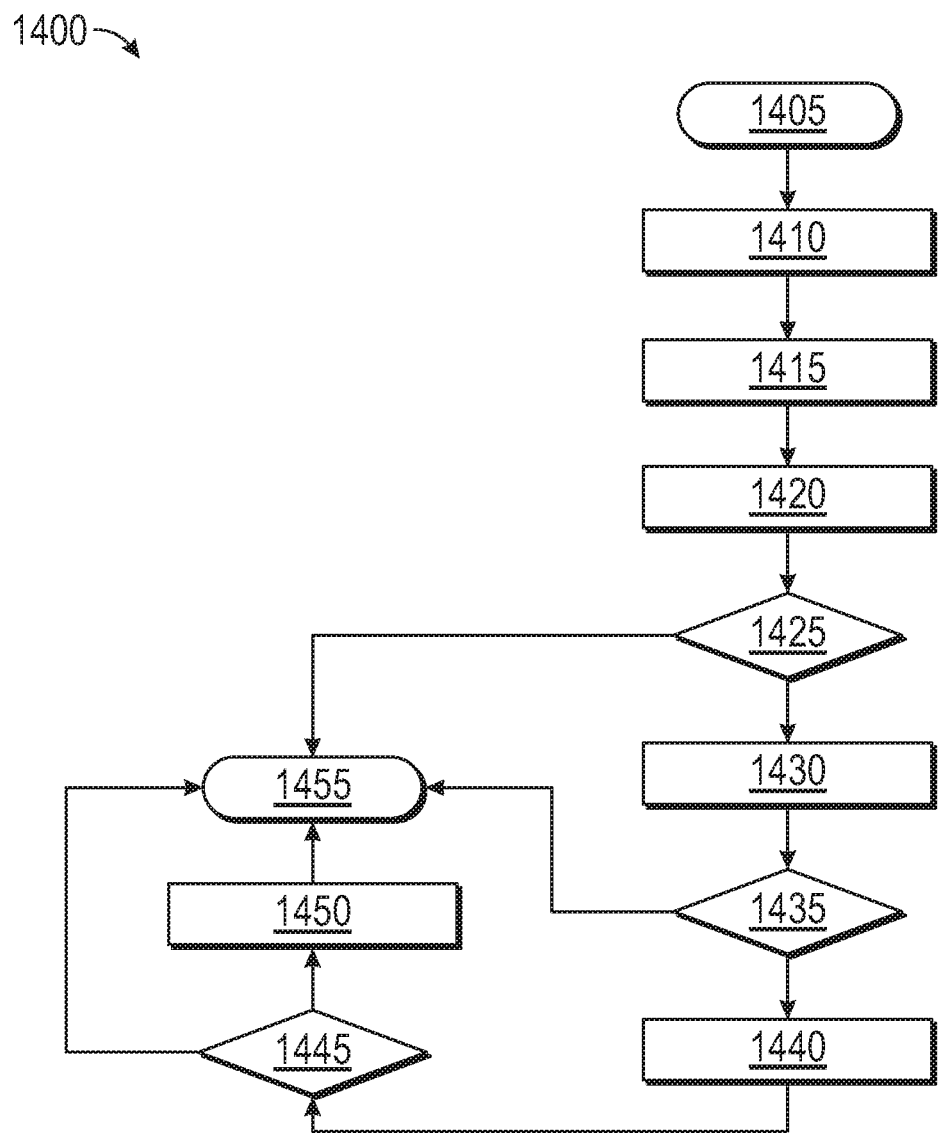
FIG. 14 is a flow chart illustrating certain method steps of a method embodying features consistent with the principles of the present disclosure.

FIG. 14 provides a flow chart 1400 illustrating certain, preferred method steps that may be used to carry out the method of determining whether or not a customer should be added to a list of leads. Step 1405 indicates the beginning of the method. During step 1410 a user 405 may login to the system 400 via the user interface 410. Once the user 405 has logged in, the system 400 may retrieve a list of leads from the database 115 and present it to the user 405 during step 1415. In a preferred embodiment, each lead within the database 115 contains the user data 430A, the timestamp when it was received, the current status of the lead (whether or not it has been acknowledged by the administrator), and any notes that the administrator has associated with it. Once the list of leads has been retrieved and presented to the user 405, the system 400 may perform a query to determine if any leads within the list of leads have not been acknowledged by a user 405 during step 1420. In one preferred embodiment, the application server 110 is configurable with a numerical unacknowledged lead notice parameter, wherein a user 405 may set a certain number of unacknowledged leads before the system 400 may take an action. Based on the results of the query, the system 400 may take an action during step 1425. If system 400 determines that no leads within the list of leads have gone unacknowledged by a user 405, the method may proceed to the terminate method step 1455. If the system 400 determines that at least one lead within the list of leads has not been acknowledged by a user 405, the system 400 may perform a query during step 1430 to determine whether or not the current time minus the timestamp associated with the unacknowledged lead is equal to more time than the time allotted within a lead notice parameter.

Based on the results of the query, the system 400 may take an action during step 1435. If the system 400 determines that the time allotted within the lead notice parameter is greater than the amount of time that has passed since the timestamp was created, the system 400 may proceed to the terminate method step 1455. If the system 400 determines that the time allotted within the lead notice parameter is less than the amount of time that has passed since the timestamp was created, the system 400 may perform a query to determine the supervisor contact from the database 115 during step 1440. Based on the results of the query, the system 400 may perform an action during step 1445. If the supervisor contact for a lead is blank, the system 400 may skip that unacknowledged lead and subsequently proceed to the terminate method step 1455. If the supervisor contact is not blank, the system 400 may send a message to the supervisor contact concerning the unacknowledged lead during step 1450. Once all of the unacknowledged leads have been skipped or have all been brought to a supervisor contact's attention via a message, the system 400 may proceed to the terminate method step 1455. In one preferred embodiment, the server 110 has a timer function which runs continuously in the background and triggers a lead review function on the application server 110 on a regular schedule.

The subject matter described herein may be embodied in systems, apparati, methods, and/or articles depending on the desired configuration. In particular, various implementations of the subject matter described herein may be realized in digital electronic circuitry, integrated circuitry, specially designed application specific integrated circuits (ASICs), computer hardware, firmware, software, and/or combinations thereof. These various implementations may include implementation in one or more computer programs that may be executable and/or interpretable on a programmable system including at least one programmable processor, which may be special or general purpose, coupled to receive data and instructions from, and to transmit data and instructions to, a storage system, and at least one peripheral device.

These computer programs, which may also be referred to as programs, software, applications, software applications, components, or code, may include machine instructions for a programmable processor, and may be implemented in a high-level procedural and/or object-oriented programming language, and/or in assembly machine language. As used herein, the term "non-transitory computer-readable medium" refers to any computer program, product, apparatus, and/or device, such as magnetic discs, optical disks, memory, and Programmable Logic Devices (PLDs), used to provide machine instructions and/or data to a programmable processor, including a non-transitory computer-readable medium that receives machine instructions as a computer-readable signal. The term "computer-readable signal" refers to any signal used to provide machine instructions and/or data to a programmable processor. To provide for interaction with a user, the subject matter described herein may be implemented on a computer having a display device, such as a cathode ray tube (CRD), liquid crystal display (LCD), light emitting display (LED) monitor for displaying information to the user and a keyboard and a pointing device, such as a mouse or a trackball, by which the user may provide input to the computer. Displays may include, but are not limited to, visual, auditory, cutaneous, kinesthetic, olfactory, and gustatory displays, or any combination thereof.

Other kinds of devices may be used to facilitate interaction with a user as well. For instance, feedback provided to the user may be any form of sensory feedback, such as visual feedback, auditory feedback, or tactile feedback; and input from the user may be received in any form including, but not limited to, acoustic, speech, or tactile input. The subject matter described herein may be implemented in a computing system that includes a back-end component, such as a data server, or that includes a middleware component, such as an application server, or that includes a front-end component, such as a client computer having a graphical user interface or a Web browser through which a user may interact with the system described herein, or any combination of such back-end, middleware, or front-end components. The components of the system may be interconnected by any form or medium of digital data communication, such as a communication network. Examples of communication networks may include, but are not limited to, a local area network ("LAN"), a wide area network ("WAN"), metropolitan area networks ("MAN"), and the internet.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For instance, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, devices, and arrangements of the parts and method stages which have been described and illustrated in order to explain the nature of this inventive subject matter can be made without departing from the principles and scope of the inventive subject matter.

What is claimed is:

1. A system for identifying new leads comprising:
    a computing entity having a user interface configured to access a vehicle finder application and a lead widget,
        wherein said vehicle finder application presents a vehicle details page to a user,
        wherein said lead widget acquires user data via a lead form presented to said user within said user interface,
        wherein said user data contains user vehicle data of a vehicle owned by said user;
    a processor operably connected to said computing entity;
    a server operably connected to said processor via a network; and
    a non-transitory computer-readable medium coupled to said processor,
        wherein said non-transitory computer-readable medium contains instructions stored thereon, which, when executed by said processor, cause said processor to perform operations comprising:
            receiving a session identifier code obtained by said vehicle finder application;
            receiving said user data from said lead widget computing entity;
            creating a lead based on said session identifier code and said user data;
            creating a plurality of targeted leads for a sweepstakes,
                wherein said plurality of targeted leads are said leads being targeted for a loan to purchase a particular vehicle and said sweepstakes,
                wherein said particular vehicle was viewed within said vehicle finder application,
                wherein each said lead comprises said session identifier code and said user data that is unique to said lead;
            creating a plurality of offer emails for said plurality of targeted leads using an email template chosen by a second user,
                wherein said plurality of offer emails pertain to said sweepstakes and a loan for purchasing said particular vehicle,
                wherein said email template contains at least one place holder variable relevant to said user data of a targeted lead of said plurality of targeted leads;
            placing a tracking tag within each offer email of said plurality of offer emails,
                wherein said tracking tag causes an email client to send a request containing an offer ID associated with said targeted lead to said server,
                wherein said server parses said request for said offer ID in order to generate a vehicle upgrade page using said user data and said user vehicle data that is specific to said targeted lead;
            sending said offer email to said plurality of targeted leads via said email client;
            waiting for said request from said email client;
            noting within said lead when said tracking tag causes said email client to send said requests to said server; and
            entering said targeted leads into said sweepstakes when said tracking tag sends said request to said server.

2. The system of claim 1, further comprising:
    a database operably connected to said processor,
        wherein said database is configured to save a targeted leads list containing said plurality of targeted leads; and
    additional instructions stored on said non-transitory computer-readable medium, which, when executed by said processor, cause said processor to perform additional operations comprising:
        saving said targeted leads list in said database.

3. The system of claim 1, further comprising permission levels, wherein said permission levels are configured to limit access to said user data of said leads.

4. The system of claim 1, further comprising a script on a webpage, wherein said script requests said lead widget from said server.

5. The system of claim 4, wherein said non-transitory computer-readable medium contains additional instructions, which, when executed by said processor, cause said processor to perform additional operations comprising:
    parsing a requested URL to determine said webpage requested by said email client.

* * * * *